(12) United States Patent
Bryant et al.

(10) Patent No.: US 9,307,281 B2
(45) Date of Patent: *Apr. 5, 2016

(54) USER DEFINED RULES FOR ASSIGNING DESTINATIONS OF CONTENT

(71) Applicant: Rovi Guides, Inc., Santa Clara, CA (US)

(72) Inventors: Jay S. Bryant, New York, NY (US); Edgar Fereira, Stamford, CT (US)

(73) Assignee: Rovi Guides, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/793,326

(22) Filed: Mar. 11, 2013

(65) Prior Publication Data

US 2013/0227615 A1    Aug. 29, 2013

Related U.S. Application Data

(63) Continuation of application No. 11/726,774, filed on Mar. 22, 2007, now Pat. No. 8,418,206.

(51) Int. Cl.
| | |
|---|---|
| H04N 7/18 | (2006.01) |
| H04N 21/433 | (2011.01) |
| H04N 21/214 | (2011.01) |
| H04N 21/258 | (2011.01) |

(Continued)

(52) U.S. Cl.
CPC ....... *H04N 21/4334* (2013.01); *H04N 5/44543* (2013.01); *H04N 5/44591* (2013.01); *H04N 5/45* (2013.01); *H04N 21/214* (2013.01); *H04N 21/2143* (2013.01); *H04N 21/2146* (2013.01); *H04N 21/258* (2013.01); *H04N 21/43615* (2013.01); *H04N 21/43622* (2013.01); *H04N 21/478* (2013.01); *H04N 21/4751* (2013.01); *H04N 21/4755* (2013.01); *H04N 21/47214* (2013.01); *H04N 21/482* (2013.01); *H04N 21/4104* (2013.01); *H04N 21/488* (2013.01)

(58) Field of Classification Search
CPC ............ H04N 21/214; H04N 21/2143; H04N 21/2146; H04N 21/258
See application file for complete search history.

(56) References Cited

U.S. PATENT DOCUMENTS

| 4,264,924 A | 4/1981 | Freeman |
| 4,264,925 A | 4/1981 | Freeman et al. |

(Continued)

FOREIGN PATENT DOCUMENTS

| CA | 2232003 | 4/1997 |
| CA | 2764753 | 6/1998 |

(Continued)

OTHER PUBLICATIONS

U.S. Appl. No. 08/900,417, filed Jul. 25, 1997, Daniels.

(Continued)

*Primary Examiner* — Dominic D Saltarelli
(74) *Attorney, Agent, or Firm* — Ropes & Gray LLP

(57) ABSTRACT

A media guidance application is provided by which users can define rules for assigning user equipment devices as destinations for media content. For example, a user may define a rule by which selected media content having attributes that satisfy a user-defined condition are downloaded, recorded, or streamed to a particular, user-specified user equipment device. The user may define and manage rules using media guidance menus, and may restrict other users from accessing the rules (e.g., parents restricting children).

18 Claims, 9 Drawing Sheets

(51) Int. Cl.
*H04N 5/445* (2011.01)
*H04N 5/45* (2011.01)
*H04N 21/436* (2011.01)
*H04N 21/472* (2011.01)
*H04N 21/475* (2011.01)
*H04N 21/478* (2011.01)
*H04N 21/482* (2011.01)
*H04N 21/41* (2011.01)
*H04N 21/488* (2011.01)

(56) References Cited

U.S. PATENT DOCUMENTS

| | | |
|---|---|---|
| 4,355,415 A | 10/1982 | George et al. |
| 4,422,105 A | 12/1983 | Rodesch et al. |
| 4,429,385 A | 1/1984 | Cichelli et al. |
| 4,488,179 A | 12/1984 | Krüger et al. |
| 4,573,072 A | 2/1986 | Freeman |
| 4,602,279 A | 7/1986 | Freeman |
| 4,605,964 A | 8/1986 | Chard |
| 4,625,080 A | 11/1986 | Scott |
| 4,630,108 A | 12/1986 | Gomersall |
| 4,694,490 A | 9/1987 | Harvey et al. |
| 4,706,121 A | 11/1987 | Young |
| 4,718,107 A | 1/1988 | Hayes |
| 4,751,578 A | 6/1988 | Reiter |
| 4,761,684 A | 8/1988 | Clark et al. |
| 4,787,063 A | 11/1988 | Muguet |
| 4,802,022 A | 1/1989 | Harada |
| 4,847,698 A | 7/1989 | Freeman |
| 4,847,700 A | 7/1989 | Freeman |
| 4,857,999 A | 8/1989 | Welsh |
| 4,866,434 A | 9/1989 | Keenan |
| 4,899,370 A | 2/1990 | Kameo et al. |
| 4,908,707 A | 3/1990 | Kinghorn |
| 4,920,432 A | 4/1990 | Eggers et al. |
| 4,930,158 A | 5/1990 | Vogel |
| 4,945,563 A | 7/1990 | Horton et al. |
| 4,947,244 A | 8/1990 | Fenwick et al. |
| 4,959,720 A | 9/1990 | Duffield et al. |
| 4,965,825 A | 10/1990 | Harvey et al. |
| 4,977,455 A | 12/1990 | Young |
| 4,994,908 A | 2/1991 | Kuban et al. |
| 5,001,554 A | 3/1991 | Johnson et al. |
| 5,016,273 A | 5/1991 | Hoff |
| 5,036,314 A | 7/1991 | Barillari et al. |
| 5,038,211 A | 8/1991 | Hallenbeck |
| 5,047,867 A | 9/1991 | Strubbe et al. |
| 5,068,733 A | 11/1991 | Bennett |
| 5,086,385 A | 2/1992 | Launey et al. |
| 5,089,885 A | 2/1992 | Clark |
| 5,105,184 A | 4/1992 | Pirani et al. |
| 5,109,279 A | 4/1992 | Ando |
| 5,113,259 A | 5/1992 | Romesburg et al. |
| 5,123,046 A | 6/1992 | Levine |
| 5,132,992 A | 7/1992 | Yurt et al. |
| 5,134,649 A | 7/1992 | Gutzmer |
| 5,134,719 A | 7/1992 | Mankovitz |
| 5,151,789 A | 9/1992 | Young |
| 5,155,591 A | 10/1992 | Wachob |
| 5,168,353 A | 12/1992 | Walker et al. |
| 5,172,413 A | 12/1992 | Bradley et al. |
| 5,179,439 A | 1/1993 | Hashimoto |
| 5,187,589 A | 2/1993 | Kono et al. |
| 5,195,134 A | 3/1993 | Inoue et al. |
| 5,200,822 A | 4/1993 | Bronfin et al. |
| 5,202,915 A | 4/1993 | Nishii |
| 5,210,611 A | 5/1993 | Yee et al. |
| 5,216,228 A | 6/1993 | Hashimoto |
| 5,223,924 A | 6/1993 | Strubbe et al. |
| 5,225,902 A | 7/1993 | McMullan, Jr. |
| 5,233,423 A | 8/1993 | Jernigan et al. |
| 5,241,428 A | 8/1993 | Goldwasser et al. |
| 5,249,043 A | 9/1993 | Grandmougin |
| 5,253,066 A | 10/1993 | Vogel |
| 5,253,275 A | 10/1993 | Yurt et al. |
| 5,283,560 A | 2/1994 | Bartlett |
| 5,285,284 A | 2/1994 | Takashima et al. |
| 5,296,931 A | 3/1994 | Na et al. |
| 5,307,173 A | 4/1994 | Yuen et al. |
| 5,319,445 A | 6/1994 | Fitts |
| 5,323,234 A | 6/1994 | Kawasaki et al. |
| 5,325,183 A | 6/1994 | Rhee |
| 5,335,079 A | 8/1994 | Yuen et al. |
| 5,335,277 A | 8/1994 | Harvey et al. |
| 5,353,121 A | 10/1994 | Young et al. |
| 5,359,367 A | 10/1994 | Stockill |
| 5,371,551 A | 12/1994 | Logan et al. |
| 5,377,317 A | 12/1994 | Bates et al. |
| 5,382,983 A | 1/1995 | Kwoh et al. |
| 5,398,074 A | 3/1995 | Duffield et al. |
| 5,410,326 A | 4/1995 | Goldstein |
| 5,410,344 A | 4/1995 | Graves et al. |
| 5,412,720 A | 5/1995 | Hoarty |
| 5,414,756 A | 5/1995 | Levine |
| 5,416,508 A | 5/1995 | Sakuma et al. |
| 5,418,622 A | 5/1995 | Takeuchi |
| 5,440,678 A | 8/1995 | Eisen et al. |
| 5,442,389 A | 8/1995 | Blahut et al. |
| 5,455,570 A | 10/1995 | Cook et al. |
| 5,459,522 A | 10/1995 | Pint |
| 5,467,264 A | 11/1995 | Rauch et al. |
| 5,469,206 A | 11/1995 | Strubbe et al. |
| 5,477,262 A | 12/1995 | Banker et al. |
| 5,479,266 A | 12/1995 | Young et al. |
| 5,479,268 A | 12/1995 | Young et al. |
| 5,479,497 A | 12/1995 | Kovarik |
| 5,481,296 A | 1/1996 | Cragun et al. |
| 5,483,278 A | 1/1996 | Strubbe et al. |
| 5,485,197 A | 1/1996 | Hoarty |
| 5,485,219 A | 1/1996 | Woo |
| 5,485,221 A | 1/1996 | Banker et al. |
| 5,488,409 A | 1/1996 | Yuen et al. |
| 5,502,504 A | 3/1996 | Marshall et al. |
| 5,517,256 A | 5/1996 | Hashimoto |
| 5,517,257 A | 5/1996 | Dunn et al. |
| 5,523,796 A | 6/1996 | Marshall et al. |
| 5,524,195 A | 6/1996 | Clanton, III et al. |
| 5,526,034 A | 6/1996 | Hoarty et al. |
| 5,528,304 A | 6/1996 | Cherrick et al. |
| 5,532,754 A | 7/1996 | Young et al. |
| 5,534,911 A | 7/1996 | Levitan |
| 5,537,141 A | 7/1996 | Harper et al. |
| 5,539,449 A | 7/1996 | Blahut et al. |
| 5,539,822 A | 7/1996 | Lett |
| 5,541,662 A | 7/1996 | Adams et al. |
| 5,543,856 A | 8/1996 | Rosser et al. |
| 5,548,345 A | 8/1996 | Brian et al. |
| 5,550,575 A | 8/1996 | West et al. |
| 5,550,576 A | 8/1996 | Klosterman |
| 5,550,863 A | 8/1996 | Yurt et al. |
| 5,553,123 A | 9/1996 | Chan et al. |
| 5,557,338 A | 9/1996 | Maze et al. |
| 5,557,724 A | 9/1996 | Sampat et al. |
| 5,559,548 A | 9/1996 | Davis et al. |
| 5,559,549 A | 9/1996 | Hendricks et al. |
| 5,559,550 A | 9/1996 | Mankovitz |
| 5,568,272 A | 10/1996 | Levine |
| 5,570,295 A | 10/1996 | Isenberg et al. |
| 5,570,415 A | 10/1996 | Stretton et al. |
| 5,572,442 A | 11/1996 | Schulhof et al. |
| 5,576,755 A | 11/1996 | Davis et al. |
| 5,579,239 A | 11/1996 | Freeman et al. |
| 5,583,560 A | 12/1996 | Florin et al. |
| 5,583,561 A | 12/1996 | Baker et al. |
| 5,583,563 A | 12/1996 | Wanderscheid et al. |
| 5,583,653 A | 12/1996 | Timmermans et al. |
| 5,585,838 A | 12/1996 | Lawler et al. |
| 5,585,858 A | 12/1996 | Harper et al. |
| 5,585,865 A | 12/1996 | Amano et al. |
| 5,585,866 A | 12/1996 | Miller et al. |
| 5,589,892 A | 12/1996 | Knee et al. |
| 5,592,482 A | 1/1997 | Abraham |
| 5,592,551 A | 1/1997 | Lett et al. |

(56) References Cited

U.S. PATENT DOCUMENTS

| | | |
|---|---|---|
| 5,594,509 A | 1/1997 | Florin et al. |
| 5,596,373 A | 1/1997 | White et al. |
| 5,600,364 A | 2/1997 | Hendricks et al. |
| 5,602,582 A | 2/1997 | Wanderscheid et al. |
| 5,606,374 A | 2/1997 | Bertram |
| 5,606,726 A | 2/1997 | Yoshinobu |
| 5,610,653 A | 3/1997 | Abecassis |
| 5,617,526 A | 4/1997 | Oran et al. |
| 5,619,247 A | 4/1997 | Russo |
| 5,619,249 A | 4/1997 | Billock et al. |
| 5,619,274 A | 4/1997 | Roop et al. |
| 5,621,456 A | 4/1997 | Florin et al. |
| 5,623,613 A | 4/1997 | Rowe et al. |
| 5,625,406 A | 4/1997 | Newberry et al. |
| 5,625,464 A | 4/1997 | Compoint et al. |
| 5,629,733 A | 5/1997 | Youman et al. |
| 5,630,119 A | 5/1997 | Aristides et al. |
| 5,631,995 A | 5/1997 | Weissensteiner et al. |
| 5,632,007 A | 5/1997 | Freeman |
| 5,635,978 A | 6/1997 | Alten et al. |
| 5,635,979 A | 6/1997 | Kostreski et al. |
| 5,635,989 A | 6/1997 | Rothmuller |
| 5,640,484 A | 6/1997 | Mankovitz |
| 5,644,354 A | 7/1997 | Thompson et al. |
| 5,646,603 A | 7/1997 | Nagata et al. |
| 5,648,813 A | 7/1997 | Tanigawa et al. |
| 5,648,824 A | 7/1997 | Dunn et al. |
| 5,650,826 A | 7/1997 | Eitz |
| 5,650,831 A | 7/1997 | Farwell |
| 5,652,613 A | 7/1997 | Lazarus et al. |
| 5,652,615 A | 7/1997 | Bryant et al. |
| 5,654,748 A | 8/1997 | Matthews, III |
| 5,654,886 A | 8/1997 | Zereski, Jr. et al. |
| 5,655,214 A | 8/1997 | Mullett et al. |
| 5,657,072 A | 8/1997 | Aristides et al. |
| 5,657,414 A | 8/1997 | Lett et al. |
| 5,659,350 A | 8/1997 | Hendricks et al. |
| 5,659,367 A | 8/1997 | Yuen |
| 5,661,516 A | 8/1997 | Carles |
| 5,666,293 A | 9/1997 | Metz et al. |
| 5,666,498 A | 9/1997 | Amro |
| 5,666,645 A | 9/1997 | Thomas et al. |
| 5,675,390 A | 10/1997 | Schindler et al. |
| 5,682,206 A | 10/1997 | Wehmeyer et al. |
| 5,684,525 A | 11/1997 | Klosterman |
| 5,686,954 A | 11/1997 | Yoshinobu et al. |
| 5,689,666 A | 11/1997 | Berquist et al. |
| 5,692,214 A | 11/1997 | Levine |
| 5,694,163 A | 12/1997 | Harrison |
| 5,694,381 A | 12/1997 | Sako et al. |
| 5,696,695 A | 12/1997 | Ehlers et al. |
| 5,696,824 A | 12/1997 | Walsh |
| 5,699,052 A | 12/1997 | Miyahara |
| 5,699,107 A | 12/1997 | Lawler et al. |
| 5,706,191 A | 1/1998 | Bassett et al. |
| 5,710,601 A | 1/1998 | Marshall et al. |
| 5,710,605 A | 1/1998 | Nelson |
| 5,710,884 A | 1/1998 | Dedrick |
| 5,715,020 A | 2/1998 | Kuroiwa et al. |
| 5,717,452 A | 2/1998 | Janin et al. |
| 5,724,091 A | 3/1998 | Freeman et al. |
| 5,727,060 A | 3/1998 | Young |
| 5,734,720 A | 3/1998 | Salganicoff |
| 5,734,853 A | 3/1998 | Hendricks et al. |
| 5,734,893 A | 3/1998 | Li et al. |
| 5,742,905 A | 4/1998 | Pepe et al. |
| 5,745,710 A | 4/1998 | Clanton, III et al. |
| 5,745,909 A | 4/1998 | Perlman et al. |
| 5,748,191 A | 5/1998 | Rozak et al. |
| 5,748,716 A | 5/1998 | Levine |
| 5,748,732 A | 5/1998 | Le Berre et al. |
| 5,751,282 A | 5/1998 | Girard et al. |
| 5,752,159 A | 5/1998 | Faust et al. |
| 5,754,771 A | 5/1998 | Epperson et al. |
| 5,754,938 A | 5/1998 | Herz et al. |
| 5,758,257 A | 5/1998 | Herz et al. |
| 5,758,259 A | 5/1998 | Lawler |
| 5,760,821 A | 6/1998 | Ellis et al. |
| 5,761,662 A | 6/1998 | Dasan |
| 5,768,528 A | 6/1998 | Stumm |
| 5,771,275 A | 6/1998 | Brunner et al. |
| 5,774,539 A | 6/1998 | Maass et al. |
| 5,774,664 A | 6/1998 | Hidary et al. |
| 5,774,666 A | 6/1998 | Portuesi |
| 5,774,859 A | 6/1998 | Houser et al. |
| 5,778,182 A | 7/1998 | Cathey et al. |
| 5,781,226 A | 7/1998 | Sheehan |
| 5,781,246 A | 7/1998 | Alten et al. |
| 5,781,734 A | 7/1998 | Ohno et al. |
| 5,787,259 A | 7/1998 | Haroun et al. |
| 5,788,507 A | 8/1998 | Redford et al. |
| 5,790,198 A | 8/1998 | Roop et al. |
| 5,790,202 A | 8/1998 | Kummer et al. |
| 5,790,935 A | 8/1998 | Payton |
| 5,793,438 A | 8/1998 | Bedard |
| 5,793,964 A | 8/1998 | Rogers et al. |
| 5,796,952 A | 8/1998 | Davis et al. |
| 5,798,785 A | 8/1998 | Hendricks et al. |
| 5,801,787 A | 9/1998 | Schein et al. |
| 5,802,284 A | 9/1998 | Karlton et al. |
| 5,805,155 A | 9/1998 | Allibhoy et al. |
| 5,805,204 A | 9/1998 | Thompson et al. |
| 5,805,763 A | 9/1998 | Lawler et al. |
| 5,805,804 A | 9/1998 | Laursen et al. |
| 5,805,806 A | 9/1998 | McArthur |
| 5,808,608 A | 9/1998 | Young et al. |
| 5,808,694 A | 9/1998 | Usui et al. |
| 5,809,204 A | 9/1998 | Young et al. |
| 5,812,123 A | 9/1998 | Rowe et al. |
| 5,812,205 A | 9/1998 | Milnes et al. |
| 5,812,930 A | 9/1998 | Zavrel |
| 5,812,931 A | 9/1998 | Yuen |
| 5,812,937 A | 9/1998 | Takahisa et al. |
| 5,818,438 A | 10/1998 | Howe et al. |
| 5,818,441 A | 10/1998 | Throckmorton et al. |
| 5,819,019 A | 10/1998 | Nelson |
| 5,819,156 A | 10/1998 | Belmont |
| 5,822,123 A | 10/1998 | Davis et al. |
| 5,828,420 A | 10/1998 | Marshall et al. |
| 5,828,945 A | 10/1998 | Klosterman |
| RE35,954 E | 11/1998 | Levine |
| 5,831,664 A | 11/1998 | Wharton et al. |
| 5,838,314 A | 11/1998 | Neel et al. |
| 5,844,620 A | 12/1998 | Coleman et al. |
| 5,846,704 A | 12/1998 | Maertens et al. |
| 5,850,218 A | 12/1998 | LaJoie et al. |
| 5,852,437 A | 12/1998 | Wugofski et al. |
| 5,861,881 A | 1/1999 | Freeman et al. |
| 5,861,906 A | 1/1999 | Dunn et al. |
| 5,864,823 A | 1/1999 | Levitan |
| 5,867,223 A | 2/1999 | Schindler et al. |
| 5,867,233 A | 2/1999 | Tanaka |
| 5,867,799 A | 2/1999 | Lang et al. |
| 5,878,222 A | 3/1999 | Harrison |
| 5,880,768 A | 3/1999 | Lemmons et al. |
| 5,883,621 A | 3/1999 | Iwamura |
| 5,884,298 A | 3/1999 | Smith, II et al. |
| 5,901,366 A | 5/1999 | Nakano et al. |
| 5,907,322 A | 5/1999 | Kelly et al. |
| 5,907,323 A | 5/1999 | Lawler et al. |
| 5,914,746 A | 6/1999 | Matthews, III et al. |
| 5,917,405 A | 6/1999 | Joao |
| 5,926,624 A | 7/1999 | Katz et al. |
| 5,929,849 A | 7/1999 | Kikinis |
| 5,929,932 A | 7/1999 | Otsuki et al. |
| 5,940,387 A | 8/1999 | Humpleman |
| 5,940,572 A | 8/1999 | Balaban et al. |
| 5,945,988 A | 8/1999 | Williams et al. |
| 5,953,485 A | 9/1999 | Abecassis |
| 5,956,025 A | 9/1999 | Goulden et al. |
| 5,956,716 A | 9/1999 | Kenner et al. |
| 5,959,592 A | 9/1999 | Petruzzelli |
| 5,963,264 A | 10/1999 | Jackson |
| 5,963,645 A | 10/1999 | Kigawa et al. |

(56) References Cited

U.S. PATENT DOCUMENTS

| | | |
|---|---|---|
| 5,969,748 A | 10/1999 | Casement et al. |
| 5,970,473 A | 10/1999 | Gerszberg et al. |
| 5,973,683 A | 10/1999 | Cragun et al. |
| 5,977,964 A | 11/1999 | Williams et al. |
| 5,982,411 A | 11/1999 | Eyer et al. |
| 5,987,509 A | 11/1999 | Portuesi |
| 5,988,078 A | 11/1999 | Levine |
| 5,990,885 A | 11/1999 | Gopinath |
| 5,990,890 A | 11/1999 | Etheredge |
| 5,991,799 A | 11/1999 | Yen et al. |
| 5,991,832 A | 11/1999 | Sato et al. |
| 5,999,691 A | 12/1999 | Takagi et al. |
| 6,002,394 A | 12/1999 | Schein et al. |
| 6,002,450 A | 12/1999 | Darbee et al. |
| 6,005,561 A | 12/1999 | Hawkins et al. |
| 6,005,565 A | 12/1999 | Legall et al. |
| 6,005,631 A | 12/1999 | Anderson et al. |
| 6,006,257 A | 12/1999 | Slezak |
| 6,009,153 A | 12/1999 | Houghton et al. |
| 6,009,465 A | 12/1999 | Decker et al. |
| 6,012,086 A | 1/2000 | Lowell |
| 6,020,880 A | 2/2000 | Naimpally |
| 6,020,883 A | 2/2000 | Herz et al. |
| 6,025,837 A | 2/2000 | Matthews, III et al. |
| 6,025,869 A | 2/2000 | Stas et al. |
| 6,035,339 A | 3/2000 | Agraharam et al. |
| 6,037,998 A | 3/2000 | Usui et al. |
| 6,038,367 A | 3/2000 | Abecassis |
| 6,040,829 A | 3/2000 | Croy et al. |
| 6,049,823 A | 4/2000 | Hwang |
| 6,057,872 A | 5/2000 | Candelore |
| 6,057,890 A | 5/2000 | Virden et al. |
| 6,058,238 A | 5/2000 | Ng |
| 6,061,779 A | 5/2000 | Garde |
| 6,064,980 A | 5/2000 | Jacobi et al. |
| 6,067,564 A | 5/2000 | Urakoshi et al. |
| 6,075,568 A | 6/2000 | Matsuura |
| 6,091,884 A | 7/2000 | Yuen et al. |
| 6,097,441 A | 8/2000 | Allport |
| 6,104,334 A | 8/2000 | Allport |
| 6,130,726 A | 10/2000 | Darbee et al. |
| 6,133,847 A | 10/2000 | Yang |
| 6,133,909 A | 10/2000 | Schein et al. |
| 6,133,910 A | 10/2000 | Stinebruner |
| 6,133,912 A | 10/2000 | Montero |
| 6,141,488 A | 10/2000 | Knudson et al. |
| 6,144,401 A | 11/2000 | Casement et al. |
| 6,144,702 A | 11/2000 | Yurt et al. |
| 6,157,411 A | 12/2000 | Williams et al. |
| 6,157,413 A | 12/2000 | Hanafee et al. |
| 6,160,988 A | 12/2000 | Shroyer |
| 6,163,316 A | 12/2000 | Killian |
| 6,169,543 B1 | 1/2001 | Wehmeyer |
| 6,172,674 B1 | 1/2001 | Etheredge |
| 6,172,677 B1 | 1/2001 | Stautner et al. |
| 6,177,931 B1 | 1/2001 | Alexander et al. |
| 6,182,094 B1 | 1/2001 | Humpleman et al. |
| 6,188,381 B1 | 2/2001 | van der Wal et al. |
| 6,188,397 B1 | 2/2001 | Humpleman |
| 6,192,340 B1 | 2/2001 | Abecassis |
| 6,195,501 B1 | 2/2001 | Perry et al. |
| 6,198,479 B1 | 3/2001 | Humpleman et al. |
| 6,199,076 B1 | 3/2001 | Logan et al. |
| 6,202,211 B1 | 3/2001 | Williams, Jr. |
| 6,208,335 B1 | 3/2001 | Gordon et al. |
| 6,208,384 B1 | 3/2001 | Schultheiss |
| 6,208,799 B1 | 3/2001 | Marsh et al. |
| 6,212,327 B1 | 4/2001 | Berstis et al. |
| 6,219,839 B1 | 4/2001 | Sampsell |
| 6,233,389 B1 | 5/2001 | Barton et al. |
| 6,233,734 B1 | 5/2001 | Macrae et al. |
| 6,236,978 B1 | 5/2001 | Tuzhilin |
| 6,237,049 B1 | 5/2001 | Ludtke |
| 6,239,794 B1 | 5/2001 | Yuen et al. |
| 6,240,240 B1 | 5/2001 | Nagano et al. |
| 6,240,555 B1 | 5/2001 | Shoff et al. |
| 6,260,088 B1 | 7/2001 | Gove et al. |
| 6,263,501 B1 | 7/2001 | Schein et al. |
| 6,263,503 B1 | 7/2001 | Margulis |
| 6,263,507 B1 | 7/2001 | Ahmad et al. |
| 6,268,849 B1 | 7/2001 | Boyer et al. |
| 6,275,648 B1 | 8/2001 | Knudson et al. |
| 6,279,029 B1 | 8/2001 | Sampat et al. |
| 6,286,142 B1 | 9/2001 | Ehreth |
| 6,292,624 B1 | 9/2001 | Saib et al. |
| 6,298,482 B1 | 10/2001 | Seidman et al. |
| 6,305,018 B1 | 10/2001 | Usui et al. |
| 6,310,886 B1 | 10/2001 | Barton |
| 6,311,011 B1 | 10/2001 | Kuroda et al. |
| 6,317,881 B1 | 11/2001 | Shah-Nazaroff et al. |
| 6,317,884 B1 | 11/2001 | Eames et al. |
| 6,321,318 B1 | 11/2001 | Baltz et al. |
| 6,324,338 B1 | 11/2001 | Wood et al. |
| 6,326,982 B1 | 12/2001 | Wu et al. |
| 6,327,418 B1 | 12/2001 | Barton |
| 6,331,877 B1 | 12/2001 | Bennington et al. |
| 6,336,099 B1 | 1/2002 | Barnett et al. |
| 6,337,715 B1 | 1/2002 | Inagaki et al. |
| 6,357,043 B1 | 3/2002 | Ellis et al. |
| 6,367,080 B1 | 4/2002 | Enomoto et al. |
| 6,374,406 B2 | 4/2002 | Hirata |
| 6,388,714 B1 | 5/2002 | Schein et al. |
| 6,389,464 B1 | 5/2002 | Krishnamurthy et al. |
| 6,396,544 B1 | 5/2002 | Schindler et al. |
| 6,397,080 B1 | 5/2002 | Viktorsson et al. |
| 6,408,435 B1 | 6/2002 | Sato |
| 6,425,000 B1 | 7/2002 | Carmello et al. |
| 6,434,524 B1 | 8/2002 | Weber |
| 6,437,836 B1 | 8/2002 | Huang et al. |
| 6,442,332 B1 | 8/2002 | Knudson et al. |
| 6,445,398 B1 | 9/2002 | Gerba et al. |
| 6,463,585 B1 | 10/2002 | Hendricks et al. |
| 6,473,559 B1 | 10/2002 | Knudson et al. |
| 6,480,889 B1 | 11/2002 | Saito et al. |
| 6,486,892 B1 | 11/2002 | Stern |
| 6,493,875 B1 | 12/2002 | Eames et al. |
| 6,505,348 B1 | 1/2003 | Knowles et al. |
| 6,509,908 B1 | 1/2003 | Croy et al. |
| 6,530,083 B1 | 3/2003 | Liebenow |
| 6,545,578 B2 | 4/2003 | Yoshiyama |
| 6,545,722 B1 | 4/2003 | Schultheiss et al. |
| 6,557,031 B1 | 4/2003 | Mimura et al. |
| 6,564,383 B1 | 5/2003 | Combs et al. |
| 6,571,279 B1 | 5/2003 | Herz et al. |
| 6,603,488 B2 | 8/2003 | Humpleman et al. |
| 6,611,654 B1 | 8/2003 | Shteyn |
| 6,622,304 B1 | 9/2003 | Carhart |
| 6,670,971 B1 | 12/2003 | Oral et al. |
| 6,675,385 B1 | 1/2004 | Wang |
| 6,678,004 B1 | 1/2004 | Schultheiss et al. |
| 6,701,523 B1 | 3/2004 | Hancock et al. |
| 6,704,028 B2 | 3/2004 | Wugofski |
| 6,721,954 B1 | 4/2004 | Nickum |
| 6,727,914 B1 | 4/2004 | Gutta |
| 6,732,369 B1 | 5/2004 | Schein et al. |
| 6,732,372 B2 | 5/2004 | Tomita et al. |
| 6,738,978 B1 | 5/2004 | Hendricks et al. |
| 6,744,967 B2 | 6/2004 | Kaminski et al. |
| 6,760,537 B2 | 7/2004 | Mankovitz |
| 6,772,433 B1 | 8/2004 | LaJoie et al. |
| 6,785,904 B1 | 8/2004 | Franken et al. |
| 6,788,882 B1 | 9/2004 | Geer et al. |
| 6,816,172 B1 | 11/2004 | Iki et al. |
| 6,822,661 B2 | 11/2004 | Sai et al. |
| 6,847,686 B2 | 1/2005 | Morad et al. |
| 6,871,146 B1 | 3/2005 | Kelly et al. |
| 6,871,186 B1 | 3/2005 | Tuzhilin et al. |
| 6,882,299 B1 | 4/2005 | Allport |
| 6,925,567 B1 | 8/2005 | Hirata |
| 6,927,806 B2 | 8/2005 | Chan |
| 6,934,964 B1 | 8/2005 | Schaffer et al. |
| 6,973,669 B2 | 12/2005 | Daniels |
| 7,003,606 B2 | 2/2006 | Fukushima et al. |
| 7,006,881 B1 | 2/2006 | Hoffberg et al. |

(56) References Cited

U.S. PATENT DOCUMENTS

| | | |
|---|---|---|
| 7,013,339 B2 | 3/2006 | Schwager et al. |
| 7,017,171 B1 | 3/2006 | Horlander et al. |
| 7,051,353 B2 | 5/2006 | Yamashita et al. |
| 7,084,780 B2 | 8/2006 | Nguyen et al. |
| 7,096,486 B1 | 8/2006 | Ukai et al. |
| 7,117,518 B1 | 10/2006 | Takahashi et al. |
| 7,134,131 B1 | 11/2006 | Hendricks et al. |
| 7,152,236 B1 | 12/2006 | Wugofski et al. |
| 7,194,755 B1 | 3/2007 | Nakata et al. |
| 7,224,886 B2 | 5/2007 | Akamatsu et al. |
| 7,328,450 B2 | 2/2008 | Macrae et al. |
| 7,343,614 B1 | 3/2008 | Hendricks et al. |
| 7,343,616 B1 | 3/2008 | Takahashi et al. |
| 7,403,693 B2 | 7/2008 | Shteyn |
| 7,480,929 B2 | 1/2009 | Klosterman et al. |
| 8,073,921 B2 | 12/2011 | Thomas et al. |
| 9,084,006 B2 | 7/2015 | Ellis et al. |
| 9,185,449 B2 | 11/2015 | Ellis et al. |
| 2001/0026533 A1 | 10/2001 | Schwager |
| 2002/0013941 A1 | 1/2002 | Ward, III et al. |
| 2002/0024893 A1 | 2/2002 | Hashimoto |
| 2002/0032907 A1 | 3/2002 | Daniels |
| 2002/0040475 A1 | 4/2002 | Yap et al. |
| 2002/0057892 A1 | 5/2002 | Mano et al. |
| 2002/0057893 A1 | 5/2002 | Wood et al. |
| 2002/0059599 A1 | 5/2002 | Schein et al. |
| 2002/0059610 A1 | 5/2002 | Ellis |
| 2002/0059621 A1 | 5/2002 | Thomas et al. |
| 2002/0073229 A1 | 6/2002 | Hayashi |
| 2002/0083455 A1 | 6/2002 | Sato |
| 2002/0090203 A1 | 7/2002 | Mankovitz |
| 2002/0095673 A1 | 7/2002 | Leung et al. |
| 2002/0100044 A1 | 7/2002 | Daniels |
| 2002/0100052 A1 | 7/2002 | Daniels |
| 2002/0118676 A1 | 8/2002 | Tonnby et al. |
| 2002/0129368 A1 | 9/2002 | Schlack et al. |
| 2002/0174424 A1 | 11/2002 | Chang et al. |
| 2002/0184626 A1 | 12/2002 | Darbee et al. |
| 2002/0194596 A1 | 12/2002 | Srivastava |
| 2003/0005445 A1 | 1/2003 | Schein et al. |
| 2003/0012555 A1 | 1/2003 | Yuen et al. |
| 2003/0028887 A1 | 2/2003 | Frouin et al. |
| 2003/0031465 A1 | 2/2003 | Blake |
| 2003/0037336 A1 | 2/2003 | Leftwich |
| 2003/0040962 A1 | 2/2003 | Lewis |
| 2003/0046270 A1 | 3/2003 | Leung et al. |
| 2003/0066085 A1 | 4/2003 | Boyer et al. |
| 2003/0071117 A1 | 4/2003 | Meade, II |
| 2003/0079227 A1 | 4/2003 | Knowles et al. |
| 2003/0084461 A1 | 5/2003 | Hoang |
| 2003/0093329 A1 | 5/2003 | Gutta |
| 2003/0097227 A1 | 5/2003 | Bloch et al. |
| 2003/0131356 A1 | 7/2003 | Proehl et al. |
| 2003/0142957 A1 | 7/2003 | Young et al. |
| 2003/0154493 A1 | 8/2003 | Kagle et al. |
| 2003/0159157 A1 | 8/2003 | Chan |
| 2003/0163813 A1 | 8/2003 | Klosterman et al. |
| 2003/0164858 A1 | 9/2003 | Klosterman et al. |
| 2003/0188310 A1 | 10/2003 | Klosterman et al. |
| 2003/0188311 A1 | 10/2003 | Yuen et al. |
| 2003/0196201 A1 | 10/2003 | Schein et al. |
| 2003/0198462 A1 | 10/2003 | Bumgardner et al. |
| 2003/0208756 A1 | 11/2003 | Macrae et al. |
| 2003/0229900 A1 | 12/2003 | Reisman |
| 2004/0031050 A1 | 2/2004 | Klosterman |
| 2004/0078820 A1 | 4/2004 | Nickum |
| 2004/0098744 A1 | 5/2004 | Gutta |
| 2004/0103439 A1 | 5/2004 | Macrae et al. |
| 2004/0194138 A1 | 9/2004 | Boylan et al. |
| 2005/0015804 A1 | 1/2005 | LaJoie et al. |
| 2005/0028208 A1 | 2/2005 | Ellis et al. |
| 2005/0028218 A1 | 2/2005 | Blake |
| 2005/0060743 A1 | 3/2005 | Ohnuma et al. |
| 2005/0120003 A1 | 6/2005 | Drury et al. |
| 2005/0177624 A1 | 8/2005 | Oswald et al. |
| 2005/0182931 A1 | 8/2005 | Robert et al. |
| 2005/0193414 A1 | 9/2005 | Horvitz et al. |
| 2005/0240962 A1 | 10/2005 | Cooper et al. |
| 2005/0240968 A1 | 10/2005 | Knudson et al. |
| 2005/0251822 A1 | 11/2005 | Knowles et al. |
| 2005/0251827 A1 | 11/2005 | Ellis et al. |
| 2005/0265169 A1 | 12/2005 | Yoshimaru et al. |
| 2005/0278741 A1 | 12/2005 | Robarts et al. |
| 2006/0031883 A1 | 2/2006 | Ellis et al. |
| 2006/0085825 A1 | 4/2006 | Istvan et al. |
| 2006/0112410 A1 | 5/2006 | Poli et al. |
| 2006/0136966 A1 | 6/2006 | Folk |
| 2006/0143133 A1 | 6/2006 | Medvinsky |
| 2006/0193474 A1 | 8/2006 | Fransdonk |
| 2007/0157242 A1 | 7/2007 | Cordray et al. |
| 2007/0204308 A1 | 8/2007 | Nicholas et al. |
| 2008/0010655 A1 | 1/2008 | Ellis et al. |
| 2008/0013429 A1 | 1/2008 | Chen et al. |
| 2008/0134239 A1 | 6/2008 | Knowles et al. |
| 2008/0184304 A1 | 7/2008 | Ellis et al. |
| 2008/0184313 A1 | 7/2008 | Knudson et al. |
| 2008/0184322 A1 | 7/2008 | Blake |
| 2008/0189742 A1 | 8/2008 | Ellis et al. |
| 2008/0189743 A1 | 8/2008 | Ellis et al. |
| 2008/0194272 A1* | 8/2008 | Smith et al. ................ 455/456.3 |
| 2008/0263600 A1 | 10/2008 | Olague et al. |
| 2009/0241144 A1 | 9/2009 | LaJoie et al. |
| 2009/0297124 A1 | 12/2009 | Ng |
| 2011/0030027 A1 | 2/2011 | Nishioka et al. |

FOREIGN PATENT DOCUMENTS

| | | |
|---|---|---|
| DE | 31 51 492 A1 | 7/1983 |
| DE | 3151492 | 7/1983 |
| DE | 44 31 438 | 3/1996 |
| DE | 44 40 174 | 5/1996 |
| DE | 4440174 | 5/1996 |
| DE | 195 02 922 | 8/1996 |
| DE | 195 31 121 A1 | 2/1997 |
| DE | 197 40 079 A1 | 3/1999 |
| EP | 0 439 281 | 7/1991 |
| EP | 0 560 593 | 9/1993 |
| EP | 0 627 857 | 12/1994 |
| EP | 0 682 452 | 11/1995 |
| EP | 0 744 853 | 11/1996 |
| EP | 0 753 964 | 1/1997 |
| EP | 0 774 853 A2 | 5/1997 |
| EP | 0 793 225 A2 | 9/1997 |
| EP | 0 795 994 | 9/1997 |
| EP | 0 805 594 A2 | 11/1997 |
| EP | 0 836 320 | 4/1998 |
| EP | 0 836 321 | 4/1998 |
| EP | 0 843 468 | 5/1998 |
| EP | 0 854 645 | 7/1998 |
| EP | 0 897 242 | 2/1999 |
| EP | 0 940 983 | 9/1999 |
| EP | 1 099 339 | 5/2001 |
| EP | 1 099 341 | 5/2001 |
| EP | 1213919 A2 | 6/2002 |
| EP | 1 271 952 | 1/2003 |
| EP | 1 515 549 | 3/2005 |
| EP | 1 538 838 | 6/2005 |
| FR | 2572235 | 4/1986 |
| FR | 2579397 | 9/1986 |
| GB | 2 227 622 | 8/1990 |
| GB | 2 229 595 | 9/1990 |
| GB | 2 256 115 | 11/1992 |
| GB | 2256546 | 12/1992 |
| GB | 2265792 | 10/1993 |
| GB | 2275800 | 9/1994 |
| GB | 2 286 754 | 8/1995 |
| GB | 2 300 551 | 11/1996 |
| GB | 2 346 251 | 8/2000 |
| JP | 02045495 | 2/1990 |
| JP | 03-22770 | 1/1991 |
| JP | 3-35451 | 2/1991 |
| JP | 03059837 | 3/1991 |
| JP | 03215781 | 9/1991 |
| JP | 04250760 | 9/1992 |

(56) References Cited

FOREIGN PATENT DOCUMENTS

| | | |
|---|---|---|
| JP | 04-276342 | 10/1992 |
| JP | 05-260400 | 10/1993 |
| JP | 06014129 | 1/1994 |
| JP | 06046345 | 2/1994 |
| JP | 06-121262 | 4/1994 |
| JP | 06-124309 | 5/1994 |
| JP | 06-208500 | 7/1994 |
| JP | 06-261139 | 9/1994 |
| JP | 07-154349 | 6/1995 |
| JP | 07-184131 | 7/1995 |
| JP | 07-212328 | 8/1995 |
| JP | 07-212331 | 8/1995 |
| JP | 07-212732 | 8/1995 |
| JP | 07-298153 | 11/1995 |
| JP | 08-032528 | 2/1996 |
| JP | 08-56352 | 2/1996 |
| JP | 08-180505 | 7/1996 |
| JP | 08-242313 | 9/1996 |
| JP | 08-242436 | 9/1996 |
| JP | 09-009245 | 1/1997 |
| JP | 09-065300 A | 3/1997 |
| JP | 09-102827 | 4/1997 |
| JP | 09-120686 A | 5/1997 |
| JP | 09-148994 A | 6/1997 |
| JP | 09-162818 A | 6/1997 |
| JP | 09-163287 | 6/1997 |
| JP | 09-270965 A | 10/1997 |
| JP | 09-298677 | 11/1997 |
| JP | 09-322022 | 12/1997 |
| JP | 10-40057 | 2/1998 |
| JP | 10-108090 | 4/1998 |
| JP | 10-257448 | 9/1998 |
| JP | 10-512420 | 11/1998 |
| JP | 11-284929 | 10/1999 |
| JP | 11-317937 | 11/1999 |
| JP | 11-512903 | 11/1999 |
| JP | 2003-198999 | 7/2003 |
| JP | 2005-149372 | 6/2005 |
| KR | 1998/025758 | 7/1998 |
| KR | 10-2000-0022091 | 4/2000 |
| WO | WO 87/03766 | 6/1987 |
| WO | WO 88/04507 | 6/1988 |
| WO | WO 89/03085 | 4/1989 |
| WO | WO-90/07844 | 7/1990 |
| WO | WO 91/07050 | 5/1991 |
| WO | WO-91/08629 | 6/1991 |
| WO | WO 92/17027 | 10/1992 |
| WO | WO 92/22983 | 12/1992 |
| WO | WO 94/14282 | 6/1994 |
| WO | WO 94/14284 | 6/1994 |
| WO | WO 94/15284 | 7/1994 |
| WO | WO 95/01058 | 1/1995 |
| WO | WO 95/01059 | 1/1995 |
| WO | WO 95/10910 | 4/1995 |
| WO | WO 95/10916 | 4/1995 |
| WO | WO 95/28055 | 10/1995 |
| WO | WO-95/32583 | 11/1995 |
| WO | WO 95/32585 | 11/1995 |
| WO | WO 95/32587 | 11/1995 |
| WO | WO 96/07270 | 3/1996 |
| WO | WO 96/13124 | 5/1996 |
| WO | WO 96/13932 | 5/1996 |
| WO | WO-96/17467 | 6/1996 |
| WO | WO 96/20555 | 7/1996 |
| WO | WO 96/26605 | 8/1996 |
| WO | WO 96/31980 | 10/1996 |
| WO | WO 96/34491 | 10/1996 |
| WO | WO 96/36172 | 11/1996 |
| WO | WO 96/37075 | 11/1996 |
| WO | WO 96/41478 | 12/1996 |
| WO | WO 97/12486 | 4/1997 |
| WO | WO 97/13368 | 4/1997 |
| WO | WO-97/13368 | 4/1997 |
| WO | WO-97/17774 | 5/1997 |
| WO | WO-97/19565 | 5/1997 |
| WO | WO 97-19565 | 5/1997 |
| WO | WO 97/22207 | 6/1997 |
| WO | WO 97/23997 | 7/1997 |
| WO | WO 97/33434 | 9/1997 |
| WO | WO 97/34413 | 9/1997 |
| WO | WO 97/35428 | 9/1997 |
| WO | WO 97/36422 | 10/1997 |
| WO | WO 97/46943 | 12/1997 |
| WO | WO 97/47106 | 12/1997 |
| WO | WO 97/47124 | 12/1997 |
| WO | WO 97/47143 | 12/1997 |
| WO | WO 97/48228 | 12/1997 |
| WO | WO 97/48230 | 12/1997 |
| WO | WO 97/49237 | 12/1997 |
| WO | WO 97/50251 | 12/1997 |
| WO | WO 98/06219 | 2/1998 |
| WO | WO 98/10589 | 3/1998 |
| WO | WO 98/10598 | 3/1998 |
| WO | WO 98/16062 | 4/1998 |
| WO | WO 98/17063 | 4/1998 |
| WO | WO 98/17064 | 4/1998 |
| WO | WO 98/26584 | 6/1998 |
| WO | WO 98/26593 | 6/1998 |
| WO | WO 98/37694 | 8/1998 |
| WO | WO 98/43183 | 10/1998 |
| WO | WO 98/43416 | 10/1998 |
| WO | WO 98/56173 | 12/1998 |
| WO | WO 98/56176 | 12/1998 |
| WO | WO 98/59478 | 12/1998 |
| WO | WO 99/03267 | 1/1999 |
| WO | WO 99/04561 | 1/1999 |
| WO | WO 99/04570 | 1/1999 |
| WO | WO 99/14947 | 3/1999 |
| WO | WO 99/30491 | 6/1999 |
| WO | WO 99/45700 | 9/1999 |
| WO | WO 99/52279 | 10/1999 |
| WO | WO 99/57839 | 11/1999 |
| WO | WO 99/60783 | 11/1999 |
| WO | WO 99/66725 | 12/1999 |
| WO | WO 00/04706 | 1/2000 |
| WO | WO 00/04707 | 1/2000 |
| WO | WO 00/04709 | 1/2000 |
| WO | WO 00/07368 | 2/2000 |
| WO | WO 00/08850 | 2/2000 |
| WO | WO 00/08851 | 2/2000 |
| WO | WO 00/08852 | 2/2000 |
| WO | WO 00/16548 | 3/2000 |
| WO | WO 00/28739 | 5/2000 |
| WO | WO 00/58833 | 10/2000 |
| WO | WO 00/62298 | 10/2000 |
| WO | WO 00/62299 | 10/2000 |
| WO | WO 00/62533 | 10/2000 |
| WO | WO 00/67475 | 11/2000 |
| WO | WO 01/22729 | 3/2001 |
| WO | WO 01/46843 | 6/2001 |
| WO | WO 01/47238 | 6/2001 |
| WO | WO 01/47249 | 6/2001 |
| WO | WO 01/47257 | 6/2001 |
| WO | WO 01/47273 | 6/2001 |
| WO | WO 01/76239 | 10/2001 |
| WO | WO 01/76248 | 10/2001 |
| WO | WO 02/078317 | 10/2002 |
| WO | WO 03/098932 | 11/2003 |
| WO | WO 2004/054264 | 6/2004 |
| WO | WO 2005/091626 | 9/2005 |
| WO | WO-2005/119463 | 12/2005 |
| WO | WO2007/121388 | 10/2007 |
| WO | WO-2007/121388 | 10/2007 |

OTHER PUBLICATIONS

"Advanced Analog Systems—Addressable Terminals" General Instrument Corp. of Horsham, Pennsylvania (URL:http//www.gi.com/BUSAREA/ANALOG/TERMINAL/WATCH/watch.html) Printed from the Internet on Mar. 4, 1999.

Intel Intercast's Website from Archieve. Org, "How Does It Work?", <http://web.archive.org/web/19990429214537/www.intercast.com/intercast/howitwks.htm>, Acessed on Jul. 8, 2008.

(56) References Cited

OTHER PUBLICATIONS

Intel Intercast's Website from Archieve. Org, "What Is It?", <http://web.archive.org/web/19990422195517/www.intercast.com/intercast/whatisit.htm>, Acessed on Jul. 8, 2008.
Bach, U., et al., "Multimediales-TV-Gereat," Radio Fernsehen Electronik, De, Veb, Verlag, Technik, Berlin, vol. 45, No. 9, Aug. 1, 1996, pp. 28, 30-31, XP 000636538, ISSN: 1436-1574 (Translation submitted in parent case, pp. 1-5).
Bach, U., et al., "Multimedia-Terminal ALS Endgeraet," Funkschau, De, Franzis-Verlag K.G. Munchen, vol. 68, No. 6, Mar. 1, 1996, pp. 70-75, XP 000556486, ISSN: 0016-2841 (Translation submitted in parent case, pp. 1-7).
"Description of Digital Audio-Visual Functionalities," Digital Audio-Visual Council, DAVIC 1.3.1 Specification Part 1, Technical Report, 86 pages, 1998.
"DIRECTV Digital Satellite Receiver—Operating Instructions," Sony Electronics Inc. (2001).
"DIRECTV Receiver with TiVo Digital Satellite Receiver/Recorder SAT-T60—Installation Guide," Sony Corporation (2000).
"DIRECTV Receiver with TiVo Installation Guide," Philips (2000).
DiRosa, S. "Pinochle's BIGSURF Netguide", Jul. 1995, Volute 3.1, pp. 260-270.
"DishPro Satellite System—User's Guide," Dish Network (undated).
Eitz, Gerhard, "Zukünftige Informations—Und Datenangebote Beim Digitalen Fernsehen—EPG Und "Lesezeichen"," Rundfunktechnische Mitteilungen, vol. 41, pp. 67-72, Jun. 1997.
"Electronic Programme Guide (EPG); Protocol for a TV Guide using electronic data transmission" by European Telecommunication Standards Institute, May 1997, Valbonne, France, publication No. ETS 300 707.
"The Evolve EZ Guide. The Remote. Control," from the Internet at http://www.evolveproducts.com/display2.html, printed on Dec. 28, 1998.
"Fall 2001 TiVo Service Update with Dual Tuner!," TiVo Inc. (2001).
Hirtz, Gentlemen: et al:, "Open TV: Betriebssystem Fuer Interaktives Fernsehen," Fernseh Und Kinotechnik, de vde Verlag GMBH, Berlin, vol. 50, No. 3, Mar. 1, 1996, pp. 84-89, XP 000581417, ISSN: 0015-0142 (Translation submitted in parent case, pp. 1-9).
Hofmann, Neumann, Oberlies, and Schadwinkel, "Videotext Programmiert Videorecorder," Rundfunktechnische Mitteilungen, Nov.-Dec. 1982, pp. 254-257.
"Honey, is there anything good on the remote tonight?", advertisement from Multichannel News, Broadband Week Section, p. 168, Nov. 30, 1998.
"How Evolve Works," from the Internet at http://www.evolveproducts.com/network.html, printed on Dec. 28, 1998.
"JiniTM Architecture Overview," by Jim Waldo, from the Internet at http://Java.sun.com/products/jini/whitepapers/architectureoverview.pdf/ printed on Jan. 25, 1999. The document bears a copyright date of 1998.
Neumann, Andreas, "WDR Online Aufbau Und Perspektiven Automatisierter Online—Dienste Im WDR," Rundfunktechnische Mitteilungen, vol. 41, pp. 56-66, Jun. 1997.
Ochiai et al., "@randomTV: A New TV System," NEC C&C Media Research Laboratories, Mar. 17, 1998, pp. 3-302-3-303 (concise explanation included in Supp. IDS in parent case).
"PTV Recorder Setup Guide," Philips (2000).
"RCA Satellite Receiver User's Guide," Thomson Multimedia Inc. (2001).
"Reaching your subscribers is a complex and costly process-until now," from the Internet at http://www.evolveproducts.com/info.html, printed on Dec. 28, 1998.
Rewind, replay and unwind with new high-tech TV devices, by Lawrence J. Magid, LA Times. This document was printed from the Internet on Jun. 6, 1999 and bears a date of May 19, 1999.
Rogers, Curt, "Telcos vs. Cable TV: The Global View," Data Communications, No. 13, New York, pp. 75, 76, 78 and 80, Sep. 1995.
Saito, Takeshi, et al., "Homenetwork Architecture Considering Digital Home Appliance," Technical Committee meeting of the Institute of Electronics, Information and Communication Engineers (IEICE), Japan, Nov. 6, 1997, vol. 97, No. 368, p. 57-64.
"Start Here," Sony, TiVo and DIRECTV (undated).
"Student.Net TV Search & Remind," from the internet at http://web.archive.org/web/19970124213237/http://www.student.net/tv/ and http://web.archive.org/web/19970124214926/www.student.net/tv/search.cgi?searchTerm=Fri . . . , printed on May 12, 2005.
"Sun's Next Steps in Digital Set-Tops," article in Cablevision, p. 56, Nov. 16, 1998.
"Teletext System," National Technical Report, vol. 27, No. 4, Aug. 1981 (with full English translation submitted in parent case).
User's Guide RCA Color TV with TV PI+ Guide, 1997.
"Using StarSight 2," published before Apr. 19, 1995.
Venditto, Gus, "Prodigy for Dummies," 1995, IDG Books, pp. 57-63 and p. 213.
"Verknuepfung von TV mit INternet," Funkschau, De, Franzis—Verlag K.G. Munchen, vol. 68, No. 18 Aug. 16, 1996, pp. 70-71, XP 000631189, ISSN: 0016-2841 (Translation submitted in parent case, pp. 1-3).
"What is Jini?", from the Internet at http://java.sun.com/products/jini/whitepapers/whatsjini.pdf, printed on Jan. 25, 1999.
"Why Jini Now?", from the internet at http://java.sun.com/products/jini/whitepapers/whyjininow.pdf, printed on Jan. 25, 1999. The document bears a copyright date of 1998.
"Windows 98 Feature Combines TV, Terminal and the Internet," New York Times, Aug. 18, 1998.
Japanese Office Action dated Sep. 18, 2013, for Japanese Patent Application No. 2009-554533 (6 pages).
U.S. Appl. No. 60/019,351, filed Jun. 6, 1996, Williams.
U.S. Appl. No. 60/020,580, filed Jun. 26, 1996, Goldschmidt.
U.S. Appl. No. 60/024,435, filed Aug. 22, 1996, Goldschmid.
U.S. Appl. No. 60/024,436, filed Aug. 22, 1996, Goldschmid.
U.S. Appl. No. 60/024,452, filed Aug. 27, 1996, Goldschmid.
U.S. Appl. No. 60/093,292, filed Jul. 17, 1998, Ellis.
U.S. Appl. No. 60/097,527, filed Aug. 21, 1998, Ellis.
Brad Schepp et al., The Complete Guide to CompuServe, Chapter 7, "IQuest and General Information Gathering," pp. 211-258, (McGraw-Hill Osborne Media, Har/Dis edition 1990).
Claims filed in U.S. Appl. No. 12/759,303 in Preliminary Amendment dated Apr. 13, 2010.
Office Action and Replies from U.S. Appl. No. 10/927,814, filed Aug. 26, 2004.
Office Action and Replies from U.S. Appl. No. 11/246,392, filed Oct. 7, 2005.
Office Actions and Corresponding Replies in relation to U.S. Appl. No. 10/251,670, accessed on Jan. 14, 2015.
Office Actions and Corresponding Replies in relation to U.S. Appl. No. 10/718,187, filed Nov. 20, 2003.
Office Actions and Corresponding Replies in relation to U.S. Appl. No. 11/600,944, filed Nov. 15, 2006.
Office Actions and Replies from U.S. Appl. No. 10/927,582, filed Aug. 26, 2004.
Office Actions and Replies from U.S. Appl. No. 11/894,741, filed Aug. 20, 2007.
Office Actions and/or Replies from U.S. Appl. No. 10/877,950, filed Jun. 25, 2004.
Office Actions and/or Replies from U.S. Appl. No. 12/759,303, filed Apr. 13, 2010.
Office Actions and/or Replies from U.S. Appl. No. 12/773,423, filed May 4, 2010.
Counterstatement of the Patentee for European Patent EP 1 213 919B dated Sep. 20, 2011.
Counterstatement of the Patentee for European Patent EP-B-1099341 (Feb. 23, 2006).
Digital Video Broadcasting (DVB); DVB specification for data broadcasting, European Telecommunications Standards Institute, Draft EN 301 192 V1.2.1 (Jan. 1999).
EBU Technical Review, published by European Broadcasting Union, Geneva, Switzerland, No. 275, Spring 1998, pp. 1-54.
EPO Opposition Against EP1213919 by Virgin Media Limited (Dec. 16, 2010).
EPO Opposition Statement of Grounds of Appeal for EP1099341 dated Feb. 25, 2011.

(56) References Cited

OTHER PUBLICATIONS

EPO Opposition Submission for European Patent EP-B-1099341 dated Mar. 19, 2010.
Examiner Interview Summary in U.S. Appl. No. 09/356,161 dated Aug. 10, 2005.
Final Office Action in U.S. Appl. No. 09/356,161 dated Jun. 17, 2005.
Final Office Action in U.S. Appl. No. 11/179,410 dated Apr. 27, 2009.
Final Office Action in U.S. Appl. No. 11/894,618 dated Aug. 3, 2009.
Motorola, Inc.; Integrated Datacasting Solutions for Digital Television XP-002204351; Jun. 1999.
Non-Final Office Action filed in U.S. Appl. No. 11/894,724 dated Jun. 9, 2009.
Non-Final Office Action filed in U.S. Appl. No. 11/894,724 dated Sep. 19, 2008.
Non-Final Office Action in U.S. Appl. No. 09/356,161 dated Oct. 7, 2004.
Non-Final Office Action in U.S. Appl. No. 11/179,410 dated Jul. 23, 2008.
Non-Final Office Action in U.S. Appl. No. 11/894,618 dated Oct. 1, 2008.
Opposition against EP99935637 by Fast TV Server AG (Aug. 3, 2005).
Opposition against EP99935637 by Velocity 303 Limited (Aug. 3, 2005).
International Search Report, International Application No. PCT/US00/05887, Aug. 2000, 2 pages.
Piesing, J., "Introduction to the MHP PVR/PDR/DVR Specification," Chair "Technical Aspects of the MHP" Philips Applied Technologies, Redhill, UK, Copyright Digital Video Broadcasting Project DVB, undated.
Reply to Non-Final Office Action filed in U.S. Appl. No. 11/894,724 dated Mar. 19, 2009.
Reply to Non-Final Office Action in U.S. Appl. No. 09/356,161 dated Mar. 7, 2005.
Reply to Non-Final Office Action in U.S. Appl. No. 11/179,410 dated Jan. 23, 2009.
Reply to Non-Final Office Action in U.S. Appl. No. 11/894,618 dated Apr. 6, 2009.
Research Disclosure, No. 329, Sep. 1991, HAVANT GB, p. 657, XP226205, "Installation of consumer apparatus".
Sun's Next Steps in Digital Set-Tops, article in Cablevision, p. 56, Nov. 16, 1998.
U.S. Appl. No. 11/179,410, Office Action issued by the United States Patent Office and applicants' response, accessed on Jan. 14, 2015.
Von Andreas Neumann, "WDR Online Aufbau Und Perspektiven Automatisierter OnlineDienste Im WDR," Rundfunktechnische Mitteilungen, vol. 41, pp. 56-66, Jun. 1997.
Von Gerhard Eitz, "Zukunftige Informations—Und Datenangebote Beim Digitalen Fernsehen—EPG Und "Lesezeichen"," Rundfunktechnische Mitteilungen, vol. 41, pp. 67-72, Jun. 1997.
Request for Continued Examination and Reply to Final Office Action in U.S. Appl. No. 11/894,618 dated Feb. 3, 2010.
Davic 1.3.1 Specification Part 1: 1998 (147 pages).
*Starsight Telecast, Inc. and United Video Properties, Inc.* v. *Virgin Media,* English High Court Judgment (2014) EWHC 828, Honorable Justice Arnold dated Mar. 26, 2014.
C. Bestler, from NCTA ([US] National Cable Television Association) Technical papers, "Flexible Data Structures and Interface Rituals for Rapid Development of OSD Applications", pp. 223-236 (1993).
Uniden® UST-4800 Super Preliminary Reference Manual, Nov. 12, 1991 (80 pages).
Michael Ellis et al, U.S. Appl. No. 60/097,527, filed Aug. 21, 1998.

\* cited by examiner

1

USER DEFINED RULES FOR ASSIGNING DESTINATIONS OF CONTENT

CROSS-REFERENCE TO RELATED APPLICATION

This application is a continuation of pending U.S. patent application Ser. No. 11/726,774, filed Mar. 22, 2007, which is hereby incorporated by reference herein in its entirety.

BACKGROUND OF THE INVENTION

This invention is directed to systems and methods for creating rules that assign user equipment devices as destinations for media content.

Using interactive media guidance applications, such as interactive television program guides, users may set up a recording by selecting a program and a recording device to perform the recording. Some interactive media guidance applications automatically select a recording device to record a program scheduled for recording based on the availability and capabilities of the recording devices associated with the user. For example, if a user has two recording devices in his home, the media guidance application may automatically record a scheduled program using the recording device with which the recording was scheduled. As another example, the media guidance application may automatically select the recording device that has sufficient space for the program (e.g., if one recording device is full). As still another example, the media guidance application may automatically record a program using a recording device that is not subject to conflict (e.g., if the tuners of a recording device are in use or scheduled to be in use).

Accordingly, it would be desirable to provide a media guidance application that receives rules defined by a user for automatically assigning a recording device to perform particular recordings. In addition, it would be desirable to provide a media guidance application that receives rules defined by a user for more generally assigning a user equipment device as a destination for selected media content.

SUMMARY OF THE INVENTION

In accordance with the principles of this invention, an interactive media guidance application receives rules defined by a user for assigning a user equipment device as a destination for media content is provided. For example, the interactive media guidance application may receive a rule identifying the particular recording device that performs a recording. As another example, the interactive media guidance application may receive a rule identifying with which to access a recording performed with a recording device of the user's media network. As still another example, the interactive media guidance application may receive a rule identifying a device for streaming or downloading media content.

A user may have access to a plurality of user equipment devices that, together, form the user's media network. To control the media content that is stored in the devices of the user's media network, the user may define one or more rules for assigning specific user equipment devices as destinations for media content. To define a rule, the user may first define one or more conditions for identifying media content to which the rule applies. The one or more conditions may include one or more attributes of media content such as, for example, genre, theme, title, actor, rating, user rankings (e.g., popularity rankings from tvguide.com), resolution, or any other suitable attribute. In some embodiments, the attributes may be automatically selected based on one or more user preference profiles (e.g., a condition to capture media content that is of interest to a particular user). In such an embodiment, the attributes selected may include, for example, the genre, theme, and actors stored in a particular user's preference profile.

The user may also select one or more user equipment devices as a destination for the media content that satisfies the conditions of a rule. For example, the user may select one or more recording devices, storage devices, computers, car systems, personal media devices, cellular telephones, or any other suitable user equipment device. Once the user has selected both at least one condition and at least one user equipment device, the user may direct the interactive media guidance application to define the rule.

In some embodiments, the interactive media guidance application may require the user to authenticate or to provide authorization information before a rule is defined or modified. For example, the interactive media guidance application may require the user to enter a parental control code before a rule is defined. This may prevent, for example, a child from setting up a rule directing the interactive media guidance application to set the child's personal device as a destination for media content that the child's parents do not wish the child to access (e.g., R-rated content).

The interactive media guidance application may store the rule in any suitable location in or out of the user's media network. For example, the interactive media guidance application may store the rule in a central location (e.g., a central server). As another example, the interactive media guidance application may store the rule in some or all of the devices of the user's media network (e.g., only in the devices identified in the rule, or only in the devices with which the user may select content for storing in the media network). As still another example, the rule may be stored in a data structure that defines the user's media network.

In some embodiments, any suitable process or method may be used to provide media content for which a particular user equipment device is a destination device. For example, the rule may be applied to programs selected for recording, streamed media content (e.g., on-demand media), webcasts, cached media content, or any other suitable process for providing media content. As another example, the rule may direct the interactive media guidance application to transfer a recorded or otherwise stored program (e.g., recorded with a default recording device) to a particular user equipment device. In some embodiments, the rules may be constrained to one or more processes (e.g., only recorded and streamed media content).

The user may select media content for which rules apply in any suitable manner. For example, the user may direct the media guidance application to identify a destination device using the rules when the user selects a program for recording. As another example, the media guidance application may use the rules as a default mechanism for identifying the destination of media content. In some embodiments, the user may direct the media guidance application to apply the rules only to content selected with particular user equipment devices (e.g., any device other than the user's primary television).

BRIEF DESCRIPTION OF THE DRAWINGS

The above and other features of the present invention, its nature and various advantages will be more apparent upon consideration of the following detailed description, taken in conjunction with the accompanying drawings in which.

DETAILED DESCRIPTION

Figure 1:
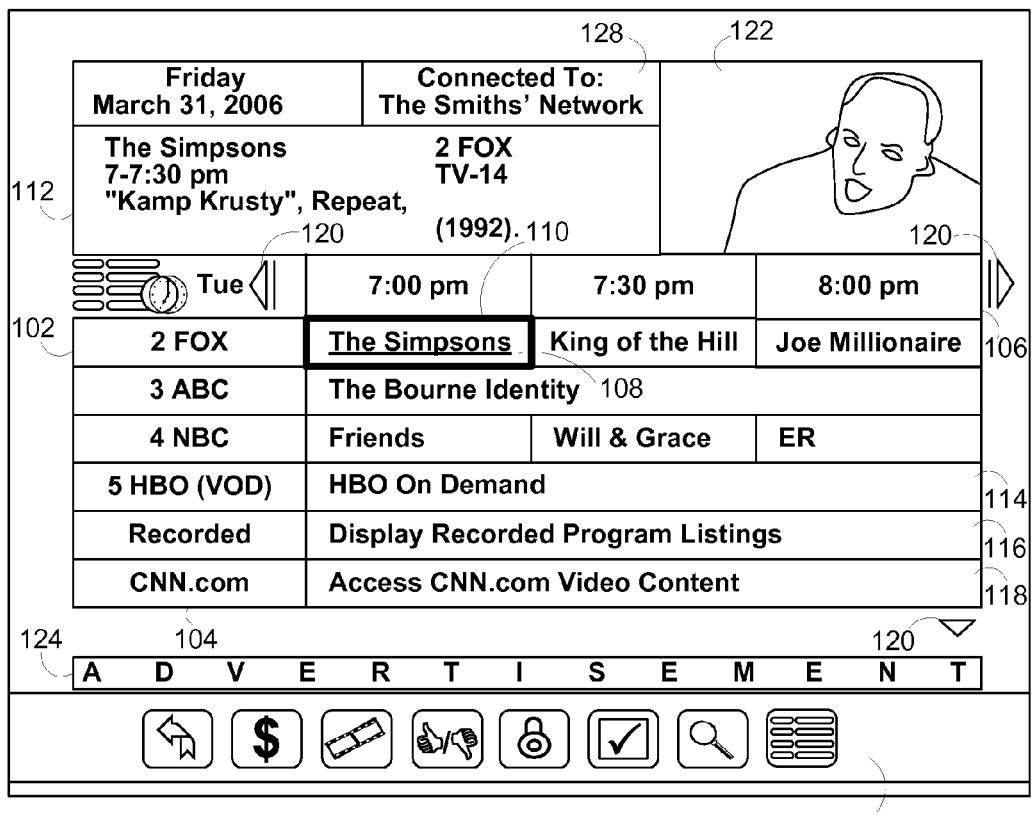
FIG. 1 shows an illustrative grid program listings display screen in accordance with one embodiment of the present invention.

The amount of media available to users in any given media delivery system can be substantial. Consequently, many users desire a form of media guidance through an interface that allows users to efficiently navigate media selections and easily identify media that they may desire. An application which provides such guidance is referred to herein as an interactive media guidance application or, sometimes, a media guidance application or a guidance application.

Interactive media guidance applications may take various forms depending on the media for which they provide guidance. One typical type of media guidance application is an interactive television program guide. Interactive television program guides (sometimes referred to as electronic program guides) are well-known guidance applications that, among other things, allow users to navigate among and locate many types of media content including conventional television programming (provided via traditional broadcast, cable, satellite, Internet, or other means), as well as pay-per-view programs, on-demand programs (as in video-on-demand (VOD) systems), Internet content (e.g., streaming media, downloadable media, Webcasts, etc.), and other types of media or video content. Guidance applications also allow users to navigate among and locate content related to the video content including, for example, video clips, articles, advertisements, chat sessions, games, etc.

With the advent of the Internet, mobile computing, and high-speed wireless networks, users are accessing media on personal computers (PCs) and other devices on which they traditionally did not, such as hand-held computers, personal digital assistants (PDAs), personal media players (e.g., MP3 players), mobile telephones, in-car television devices, or other mobile devices. On these devices users are able to navigate among and locate the same media available through a television. Consequently, media guidance is necessary on these devices, as well. The guidance provided may be for media content available only through a television, for media content available only through one or more of these devices, or for media content available both through a television and one or more of these devices. The media guidance applications may be provided as on-line applications (i.e., provided on a web-site), or as stand-alone applications or clients on hand-held computers, PDAs, mobile telephones, or other mobile devices. The various devices and platforms that may implement media guidance applications are described in more detail below.

A user, as referred to herein, may be an individual user or a group of users such as the members of a family or a group of friends, for example. A user may use multiple user equipment devices, such as a television, a cell-phone and a personal media player, to access media content. The user equipment devices used by the user form the user's media network. The user's media network may be a home network including, for example, the user's television and personal computer connected through the user's WIFI home network. Alternatively, the user's media network may include user equipment devices connected through the Internet or third-party networks including television service provider networks and cell-phone networks, for example (e.g., a work computer for accessing an on-line interactive program guide, a television and recording device in the user's car, and a plurality of televisions and recording devices in the user's home). The user's media network may include equipment devices that are only used by the user, such as the user's cell-phone. The user's media network may also include shared equipment, such as a television used by multiple members of a household. In some embodiments, shared equipment may be associated with a primary user or group of users (e.g., the television in the parents' bedroom is associated with the parents, while the television in the game room is associated with a child).

User profile information for the user equipment devices of a user's media network may be shared between the devices to coordinate the media guidance provided to the user on each device. The coordination may include sharing user configuration information to provide a common or similar media guidance interface on all of the user's devices. The coordination may also include sharing preference information in order to provide coordinated media content recommendation on the devices. The coordination may include sharing media content information, to allow a user to access recorded content or other stored content from multiple devices. The coordination may provide additional functionality, such as allowing the user to remotely communicate with or control devices on the user's media network using another device on the network.

The media guidance application may provide users with the opportunity to define rules for assigning particular devices of a user's media network as destination devices. Such rules may automatically control where media content is transmitted, stored, or both in the media network. A destination device is a device that can be used to store (e.g., download, cache or record) or display (e.g., stream) media content. The rules may define conditions for identifying media content that is assigned a destination device. In some embodiments, the conditions may be based on the attributes of the media content (e.g., rating, actors, high definition, or theme). In some embodiments, the conditions may be based on the manner in which the media content is received (e.g., recorded, streamed or cached). For example, a rule may assign recordings to particular recording devices. As another example, a rule may assign downloaded content to a particular device of the media network (e.g., media content downloaded from an online store, such as iTunes or Google Video, may be downloaded to a user's personal media device). As still another example, a rule may assign media content streamed from a server (e.g., a VOD server) or provided by a webcast to a particular user device.

One of the functions of the media guidance application is to provide media listings and media information to users. FIGS. 1-6 show illustrative display screens that may be used to provide media guidance, and in particular media listings. The display screens shown in FIGS. 1-6 may be implemented on any suitable device or platform. While the displays of FIGS. 1-6 are illustrated as full screen displays, they may also be fully or partially overlaid over media content being displayed. A user may indicate a desire to access media information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media information organized in one of several ways, such as by time and channel in a grid, by time, by channel, by media type, by category (e.g., movies, sports, news, children, or other categories of programming), or other predefined, user-defined, or other organization criteria.

FIG. 1 shows illustrative grid program listings display 100 arranged by time and channel that also enables access to different types of media content in a single display. Display 100 may include grid 102 with: (1) a column of channel/media type identifiers 104, where each channel/media type identifier (which is a cell in the column) identifies a different channel or media type available; and (2) a row of time identifiers 106, where each time identifier (which is a cell in the row) identifies a time block of programming. Grid 102 also includes cells of program listings, such as program listing 108, where each listing provides the title of the program provided on the listing's associated channel and time. With a user input device, a user can select program listings by moving highlight region 110. Information relating to the program listing selected by highlight region 110 may be provided in program information region 112. Region 112 may include, for example, the program title, the program description, the time the program is provided (if applicable), the channel the program is on (if applicable), the program's rating, and other desired information.

In addition to providing access to linear programming provided according to a schedule, the media guidance application also provides access to non-linear programming which is not provided according to a schedule. Non-linear programming may include content from different media sources including on-demand media content (e.g., VOD), Internet content (e.g., streaming media, downloadable media, etc.), locally stored media content (e.g., video content stored on a digital video recorder (DVR), digital video disc (DVD), video cassette, compact disc (CD), etc.), or other time-insensitive media content. On-demand content may include both movies and original media content provided by a particular media provider (e.g., HBO On Demand providing "The Sopranos" and "Curb Your Enthusiasm"). HBO ON DEMAND, THE SOPRANOS, and CURB YOUR ENTHUSIASM are trademarks owned by the Home Box Office, Inc. Internet content may include web events, such as a chat session or Webcast, or content available on-demand as streaming media or downloadable media through an Internet web site or other Internet access (e.g. FTP).

Grid 102 may provide listings for non-linear programming including on-demand listing 114, recorded media listing 116, and Internet content listing 118. A display combining listings for content from different types of media sources is sometimes referred to as a "mixed-media" display. The various permutations of the types of listings that may be displayed that are different than display 100 may be based on user selection or guidance application definition (e.g., a display of only recorded and broadcast listings, only on-demand and broadcast listings, etc.). As illustrated, listings 114, 116, and 118 are shown as spanning the entire time block displayed in grid 102 to indicate that selection of these listings may provide access to a display dedicated to on-demand listings, recorded listings, or Internet listings, respectively. In other embodiments, listings for these media types may be included directly in grid 102. Additional listings may be displayed in response to the user selecting one of the navigational icons 120. (Pressing an arrow key on a user input device may affect the display in a similar manner as selecting navigational icons 120.)

Display 100 may also include video region 122, advertisement 124, options region 126, and user media network identification region 128. User media network identification region 128 may identify the user media network with which the media guidance application is currently associated. Video region 122 may allow the user to view and/or preview programs that are currently available, will be available, or were available to the user. The content of video region 122 may correspond to, or be independent from, one of the listings displayed in grid 102. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the present invention.

Advertisement 124 may provide an advertisement for media content that, depending on a viewer's access rights (e.g., for subscription programming), is currently available for viewing, will be available for viewing in the future, or may never become available for viewing, and may correspond to or be unrelated to one or more of the media listings in grid 102. Advertisement 124 may also be for products or services related or unrelated to the media content displayed in grid 102. Advertisement 124 may be selectable and provide further information about media content, provide information about a product or a service, enable purchasing of media content, a product, or a service, provide media content relating to the advertisement, etc. Advertisement 124 may be targeted based on a user's profile/preferences, monitored user activity, the type of display provided, or on other suitable targeted advertisement bases.

While advertisement 124 is shown as rectangular or banner shaped, advertisements may be provided in any suitable size, shape, and location in a guidance application display. For example, advertisement 124 may be provided as a rectangular shape that is horizontally adjacent to grid 102. This is sometimes referred to as a panel advertisement. In addition, advertisements may be overlaid over media content or a guidance application display or embedded within a display. Advertisements may also include text, images, rotating images, video clips, or other types of media content. Advertisements may be stored in the user equipment with the guidance application, in a database connected to the user equipment, in a remote location (including streaming media servers), or on other storage means or a combination of these locations. Providing advertisements in a media guidance application is discussed in greater detail in, for example, Knudson et al., U.S. patent application Ser. No. 10/347,673, filed Jan. 17, 2003, Ward, III et al. U.S. Pat. No. 6,756,997, issued Jun. 29, 2004, and Schein et al. U.S. Pat. No. 6,388,714, issued May 14, 2002, which are hereby incorporated by reference herein in their entireties. It will be appreciated that advertisements may be included in other media guidance application display screens of the present invention.

Options region 126 may allow the user to access different types of media content, media guidance application displays, and/or media guidance application features. Options region 126 may be part of display 100 (and other display screens of the present invention), or may be invoked by a user by selecting an on-screen option or pressing a dedicated or assignable button on a user input device. The selectable options within options region 126 may concern features related to program listings in grid 102 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, access to various types of listing displays, subscribe to a premium service, edit a user's profile, define a rule for assigning a destination for media content, access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of media content listings displayed (e.g., only HDTV programming, user-specified broadcast channels based on favorite channel selections, re-ordering the display of channels, recommended media content, etc.), desired recording features (e.g., recording or series recordings for particular users, recording quality, etc.), parental control settings, and other desired customizations.

The media guidance application may allow a user to provide user profile information or may automatically compile user profile information. The media guidance application may, for example, monitor the media the user accesses and/or other interactions the user may have with the guidance application. Additionally, the media guidance application may obtain all or part of other user profiles that are related to a particular user (e.g., from other web sites on the Internet the user accesses, such as www.tvguide.com, from other media guidance applications the user accesses, from other interactive applications the user accesses, from a handheld device of the user, etc.), and/or obtain information about the user from other sources that the media guidance application may access. As a result, a user can be provided with a unified guidance application experience across the user's different devices. This type of user experience is described in greater detail below in connection with FIG. 4. Additional personalized media guidance application features are described in greater detail in Ellis et al., U.S. patent application Ser. No. 11/179,410, filed Jul. 11, 2005, Boyer et al., U.S. patent application Ser. No. 09/437,304, filed Nov. 9, 1999, and Ellis et al., U.S. patent application Ser. No. 10/105,128, filed Feb. 21, 2002, which are hereby incorporated by reference herein in their entireties.

Figure 2:
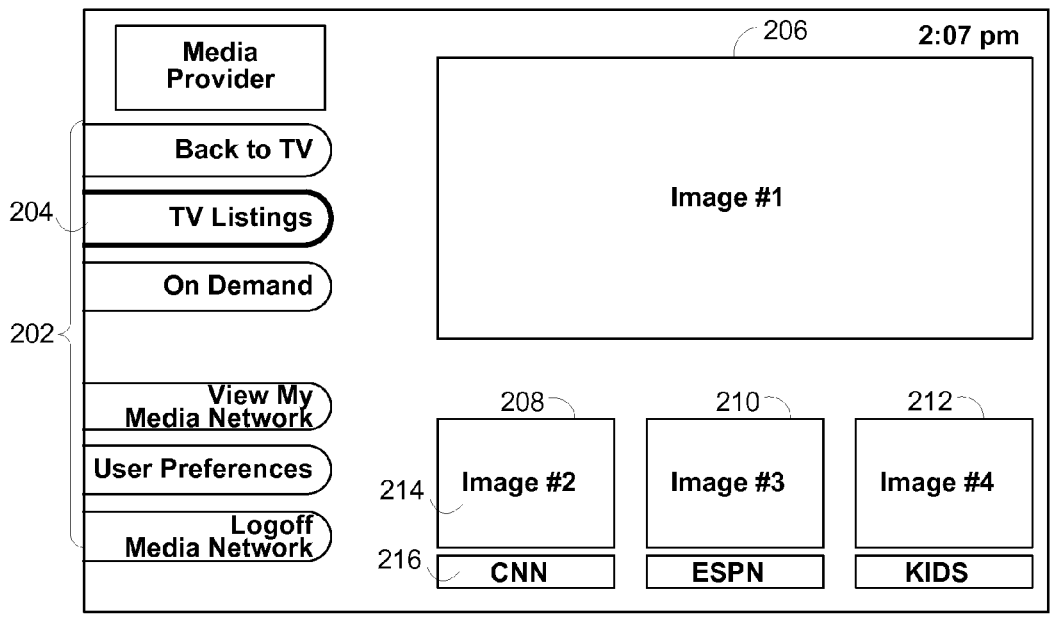
FIG. 2 shows an illustrative video mosaic program listings display screen in accordance with one embodiment of the present invention.

Another display arrangement for providing media guidance is shown in FIG. 2. Video mosaic display 200 includes selectable options 202 for media content information organized based on media type, genre, and/or other organization criteria. In display 200, television listings option 204 is selected, thus providing listings 206, 208, 210, and 212 as broadcast program listings. Unlike the listings from FIG. 1, the listings in display 200 are not limited to simple text (e.g., the program title) and icons to describe media. Rather, in display 200 the listings may provide graphical images including cover art, still images from the media content, video clip previews, live video from the media content, or other types of media that indicate to a user the media content being described by the listing. Each of the graphical listings may also be accompanied by text to provide further information about the media content associated with the listing. For example, listing 208 may include more than one portion, including media portion 214 and text portion 216. Media portion 214 and/or text portion 216 may be selectable to view video in full-screen or to view program listings related to the video displayed in media portion 214 (e.g., to view listings for the channel that the video is displayed on).

The listings in display 200 are of different sizes (i.e., listing 206 is larger than listings 208, 210, and 212), but if desired, all the listings may be the same size. Listings may be of different sizes or graphically accentuated to indicate degrees of interest to the user or to emphasize certain content, as desired by the media provider or based on user preferences. Various systems and methods for graphically accentuating media listings are discussed in, for example, Yates, U.S. patent application Ser. No. 11/324,202, filed Dec. 29, 2005, which is hereby incorporated by reference herein in its entirety.

Selectable options 202 may also include user media network options such as View My Media Network, User Preferences and/or Logoff Media Network options. View My Media Network option may be used to view a list of user equipment devices that are associated with the current user media network. The View My Media Network option may also be used to add or remove devices from a user's media network. The User Preferences option may be used to access a user preference menu allowing the user to modify user preference and user personalization options associated with the user's media network and/or the device the media guidance application is associated with. The user preference menu may also allow the user to define and modify rules for assigning a device of the user media network as a destination for media content. The Logoff Media Network option may be used to log off of the user media network the media guidance application is currently associated with, and/or to log on to a different user media network. Further access features for user media networks are discussed in connection with FIG. 3.

Figure 3:
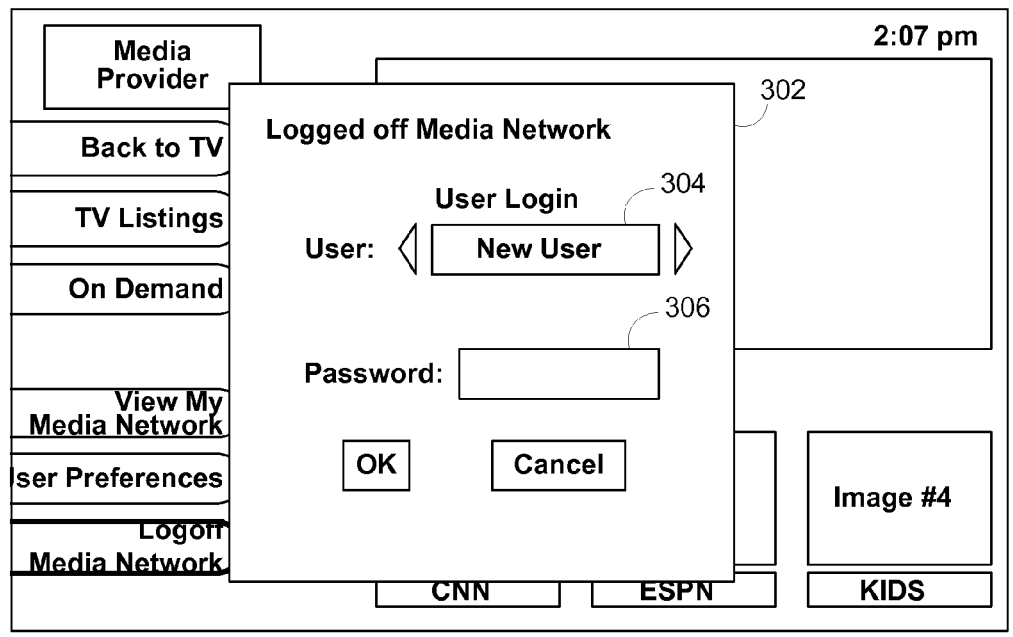
FIG. 3 shows an illustrative login overlay in accordance with one embodiment of the present invention.

FIG. 3 shows an illustrative login overlay 302 that allows a user to log in to a user media network. Login overlay 302 may be presented in response to a user selection of the Logoff Media Network menu option 202 of FIG. 2, for example. Login overlay 302 may include a user selection field 304 and a password field 306. A user may enter a username or other identifier in user selection field 304 by using the arrow buttons to the left and right of field 304 to toggle between the names of users that have recently used the user equipment device. A user may alternatively type a username or identifier into field 304, or use other appropriate means to identify themselves to the user equipment device. An optional password field 306 may be used to confirm the identity of the user logging on.

The login feature may be required in order to associate a user equipment device with a user's media network. A user may be required to log in to her media network the first time she uses a user equipment device. The act of logging into the user's media network may permanently associate the device with the user's media network by storing an identifier of the device in the user's media network profile information. The act of logging in may also download at least part of the profile information associated with the user's media network onto the user equipment device, allowing the user to access her personalization and preference options and her media content information from the device. The device may remain associated with the media network until the user removes the device from her media network.

Alternatively, the user may be required to login to her media network every time she uses the user equipment device in order to confirm her identity to the device and/or to her media network. In the case of shared devices that may be used by multiple users, for example, logging into the user's media network may ensure that the correct user's profile information is loaded onto the equipment device. Other means of logging onto the device may be used. For example, the device may automatically detect the identity of the user using the equipment device based on the user's interactions with the device, and in response to the automatic detection, may prompt the user to confirm her identity or automatically log in to the user's media network. As another example, the device may automatically detect the identity of the user based on the time of day (e.g., a day-parting approach).

Figure 4:
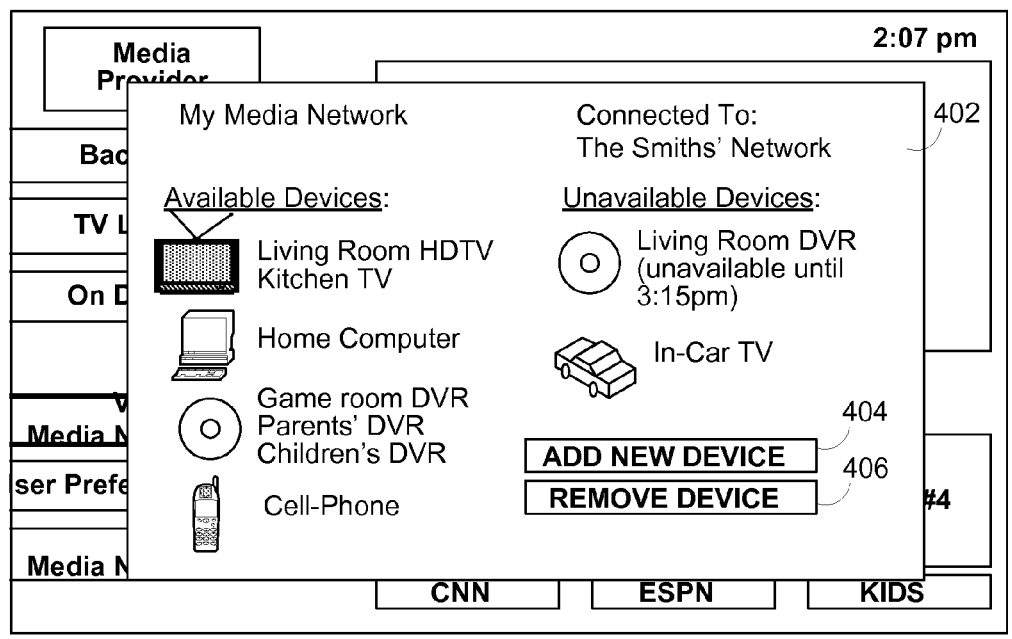
FIG. 4 shows an illustrative user media network viewing overlay in accordance with one embodiment of the present invention.

FIG. 4 shows an illustrative overlay 402 of a user's media network allowing a user to view user equipment devices associated with the user's media network (e.g., in response to a user selection of the View My Media Network option 202, FIG. 2). The devices associated with the user's media network may be displayed according to the device types (e.g., television, PC, recording device, cell-phone), and according to whether the devices are currently available or unavailable. The media guidance application may identify the user equipment devices associated with the user's media network from, for example, a user media network data structure (e.g., data structure 1000, FIG. 10).

Devices may be unavailable if, for example, they are turned off, they are not currently connected to the network, they are being used by other users, or they are performing background functions such as a scheduled recording. A device may also be marked as unavailable if the device, or features of the device, cannot be accessed from the device the media network is being accessed from. A device may not be accessible because of limitations of the device or limitations imposed by service providers. For example, a cell-phone device may be indicated as unavailable on the user's home television system because the set-top box may not be capable of accessing recordings stored on the phone or scheduling recordings on the phone. In another embodiment, the cell-phone device may be indicated as unavailable because of limitations imposed by telephone service and/or television service providers. For example, limitations imposed by a cell-phone telephone service provider may bar users from scheduling recordings on home television systems using the users' cell-phones. The service providers may limit cross-device functionality and may make such functionality available to users having both their phone service and television service with the same provider, for example. Alternatively, full cross-device functionality may be available for an additional fee. In another embodiment, cross-device functionality may be limited by agreements that users may have entered into. For example, a user may have purchased a recording for playback on a single device, or on particular types of devices, but the recording and/or the device having the recording may be marked as unavailable if the user tries to access the recording from an unauthorized device.

Available devices which will become unavailable at a scheduled time may include indications of the time at which they will become unavailable. Similarly, unavailable devices that will become available at a scheduled time may include indications of their future availability. For example, a recording device that is currently recording a program may be listed as unavailable and may include an indication that the device will become available at a scheduled time (as shown). Conversely, a recording device that is currently available may contain an indication of when it will become unavailable (e.g., the start time of its next scheduled recording).

Overlay 402 may also include a menu option 404 for adding a new device to the network. Menu option 404 may be used to associate the user equipment device currently being used by the user with the user's media network. Menu option 404 may also be used to associate another device with the user's media network by, for example, requesting that the user identify the device to be associated with the network by providing an IP address or other unique identifier of the device. Menu option 406 may allow the user to remove a device from the user's media network. Menu option 406 may be used to disassociate the device being used by the user from the user's media network. Menu option 406 may also be used to disassociate other devices from the user's media network.

The selection of a device listed from overlay 402 may allow a user to access options relating to the device. The user may, for example, access a schedule of the device indicating times at which the device is scheduled to be available or unavailable. The user may also access options for sending a message for display on the device, for remotely controlling the device (e.g., for setting up a recording on a recording device), or for accessing other information relating to the device (e.g., for accessing a list of media content recorded on a recording device).

Figure 5:
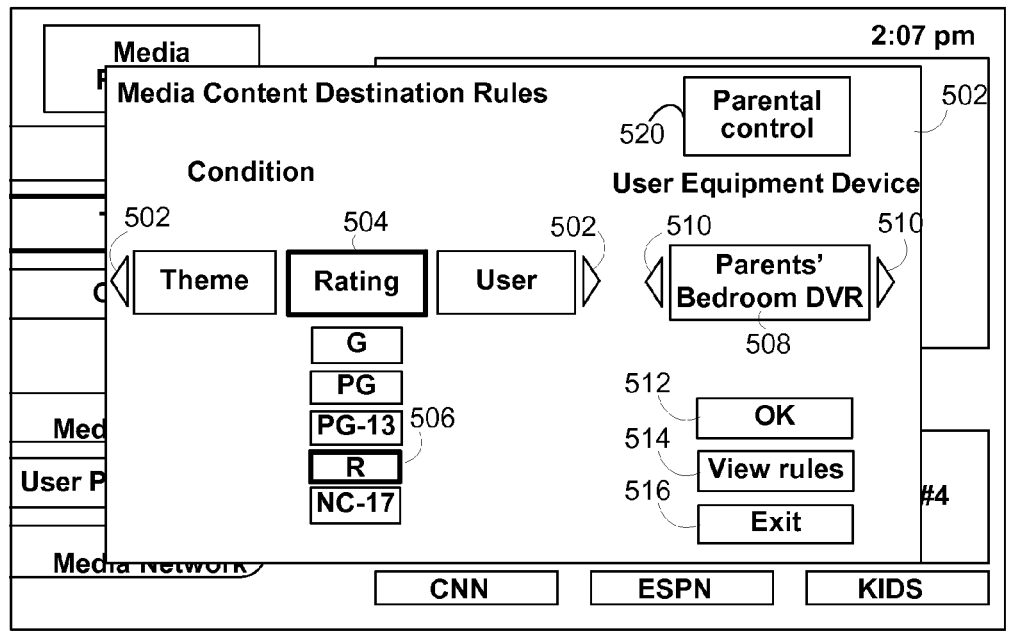
FIG. 5 shows an illustrative rules overlay in accordance with one embodiment of the present invention.

FIG. 5 shows an illustrative overlay 502 of a menu for allowing a user to define rules for assigning one or more devices of the user's media network as a destination for media content. Overlay 502 includes condition field 504 and user equipment device field 508. To define a rule for automatically assigning a destination for media content, the user may first select a condition for identifying media content. In some embodiments, the condition may be an attribute of media content. For example, the user may select a condition type using arrows 502. In response to a user selection of a condition type, listing 506 of fields associated with the condition type is displayed. The user may then select one or more fields using a highlight region to define the condition for identifying media content.

The user may select any suitable condition type in condition field 504. Such condition types may include, for example, program rating, themes, channel, actor, actress, or any other suitable condition type. In some embodiments, the condition type may include the user (e.g., the user requesting or scheduling a recording), or a user profile (e.g., to capture media that fits within the user's profile information). In some embodiments, the condition type may include the manner in which the media content is transmitted. In the example, of FIG. 5, the displayed condition types are Theme, Rating, and User. Any suitable field may be displayed for each selected condition type. For example, when a user or user profile is selected, the fields displayed may include a listing of users or user profiles associated with one or more devices of the currently selected user media network (e.g., the members of a household). In the example of FIG. 5, the fields listed under the condition type Rating include G, PG, PG-13, R and NC-17. In some embodiments, the user may simultaneously select a plurality of condition types, fields, or both to define a condition for identifying media content (e.g., the media guidance application may display a plurality of condition types and logical operators between the condition types).

In addition to setting up a condition, the user may select one or more user equipment devices of the user media network as a destination for the media content that satisfies the condition. To select a device, the user may select a device in user equipment device field 508 using arrows 510. The user equipment devices that the user may scroll through in field 508 may include the user equipment devices of the user's media network. In some embodiments, the user may enter identification information (e.g., an IP address or other unique identifier) for a user equipment device that is not listed in field 508.

When the user has selected both the one or more conditions and the one or more user equipment devices for the rule, the user may select an option to define the rule. In the example of FIG. 5, the user selects OK option 512. In response to receiving the user request to define the rule, the media guidance application may store the rule in memory. The rule may also be added to the user profile of the user setting up the rule, transmitted to the devices of the user media network, transmitted to the destination device, or stored in any other suitable location. In some embodiments, if the user is in a household, the rule may be incorporated in the user profiles of each of the users of the household.

The user may view a listing of rules that have been defined by selecting a View Rules option (e.g., option 514). In response to the user selection of the option, the media guidance application may display a listing of rules, which the user may select to modify or remove a rule. The listing may be displayed in a new screen, in an overlay, in a pop-up window, or in any other suitable manner.

When the user has finished managing the rules, the user may return to other display screens of the media guidance application (e.g., screen 100 of FIG. 1 or screen 200 of FIG. 2) by selecting an Exit option. In the example of FIG. 5, the user may select Exit option 516.

In some embodiments, the rules may be protected by a parental control feature. This feature may prevent a child, for example, from having R rated media recorded to a recording device in the child's room or downloaded to the child's media player without the parents' knowledge. To access a parental control menu, the user may select Parent Control Option 520. The parental control menu (not shown), may include a field for entering a parental control password. In response to receiving the correct parental control password, the parental control menu may provide the user with access to some or all options of overlay 500 (e.g., OK option 512), or define or modify the rules as requested by the user.

The user may be required to log in to access overlay 500. For example, the user may be required to log in to his media network (e.g., using overlay 300, FIG. 3). In some embodiments, the parental control menu may serve as a login. This may serve to associate the rules with the user's profile information. The media guidance application may in addition or instead associate the rule with the devices of the user's media network. In such an embodiment, when media content is selected to be stored in a particular user's media network, the rules of all users who are associated with user equipment devices of the user's media network may be applied (e.g., the parents' and older siblings' rules in a household are applied to a younger sibling's recording request).

If the user does not log in, the media guidance application may use a default media network and apply the rules that are associated with the user equipment devices of the network, or require the user to select one or more particular user equipment devices. This approach may be used, for example, for a member of a household that does not have a user ID associated with a particular media network (e.g., a young child in a family does not log-in, and uses a default family media network), or guests (e.g., a babysitter).

A user may remotely assign any device associated with the user's media network as a destination for media content. In some embodiments, the media guidance application may automatically select or recommend a device from the plurality of devices of the user's media network as a destination for media content that satisfies the conditions of a rule. In some embodiments, the user may assign a device as a destination for media content from a web-interface or other user interface allowing the user to communicate with and access information about the media network. The web-interface or other user interface may run on a device of the media network or on a device that is not part of the media network.

Any suitable interface may be used to assign one or more user equipment devices as a destination for media content. For simplicity, the following interface will be described in the context of assigning user equipment devices for recording media content. It will be understood, however, that this or another interface with some or all of the same features may be used to assign one or more equipment devices as a destination for media content in other contexts. Such contexts may include, for example, streaming, downloading, webcasts, caching, or transferring a recorded program to another user equipment device.

Figure 6:
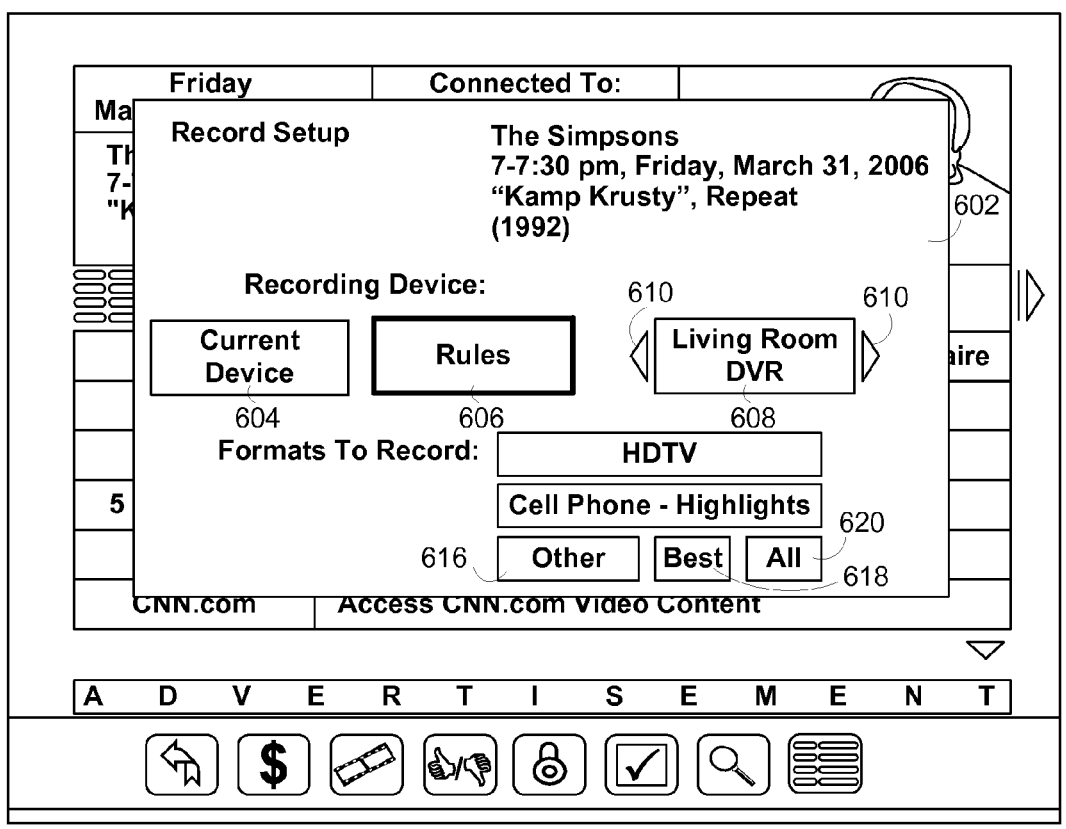
FIG. 6 shows an illustrative record-setup overlay in accordance with one embodiment of the present invention.

FIG. 6 shows an illustrative display 600 of a record-setup overlay 602. Overlay 602 may be presented in response to, for example, the user selecting a Record option while highlight region 110 of FIG. 1 is located on program listing 108. As another example, overlay 602 may be displayed in response to a user pressing a Record key or key sequence while the program is displayed. Overlay 602 may allow the user to select to record media content on any recording device associated with the media network using selection arrows 610 and recording device selection option 608. Alternatively, the user may select to record the program on the device the user is currently using by selecting Current Device option 604, or allow the media guidance application to select a recording device using the rules by selecting Rules option 606.

In response to a user selection of Rules option 606 to set-up a recording, the media guidance application retrieves the rules and applies the condition of each rule to the media content scheduled for recording. After identifying the one or more rules for which the media content satisfies the condition, the media guidance application may schedule the media content for recording with the recording devices specified in the identified rules. In some embodiments, if two or more rules apply to the media content, a single recording may be performed using a single recording device based on an ordering of the rules (e.g., ratings related rules have priority over user-preference and theme related rules, or an ordering set by the user). Alternatively, the media guidance application may direct some or all of the recording devices identified in the rules to perform the recording. In some embodiments, a user may order the rules in response to selecting a View Rules option (e.g., option 514, FIG. 5) to set the relative priority of each rule. The ability to order rules may also be limited to users with the proper parental control password.

In some embodiments, the user may also select one or more formats in which to record the media content. As shown in overlay 602, a user may select to record media content in HDTV format and in a Cell Phone-Highlights format, corresponding to an edited version suitable for viewing on a cell-phone and containing only highlights of the program. A user may select additional formats to record the media content in using Other option 616. A user may select to record the media content in the best available format(s) by selecting Best option 618. Best option 618 may allow the user to record the media content in the highest quality format the content is available in, or in the highest quality format available that can be viewed on the recording device or on any of the user equipment devices associated with the user's media network. A user may select to record the media content in all available formats by selecting All option 618. All option 618 may alternatively allow the user to record the media content in the available formats that are suitable for viewing or recording on user equipment devices associated with the user's media network (e.g., do not record a program in HD if no user equipment device is HD capable). In some embodiments, the rules may automatically determine the format used for the selected content.

In some embodiments, the media guidance application may automatically select a recording device and a format for the selected media content. For example, the rules may the a default selection for identifying the one or more recording devices that are selected to perform the recording. As another example, the rules may automatically select a format for recording the selected content.

Figure 7:
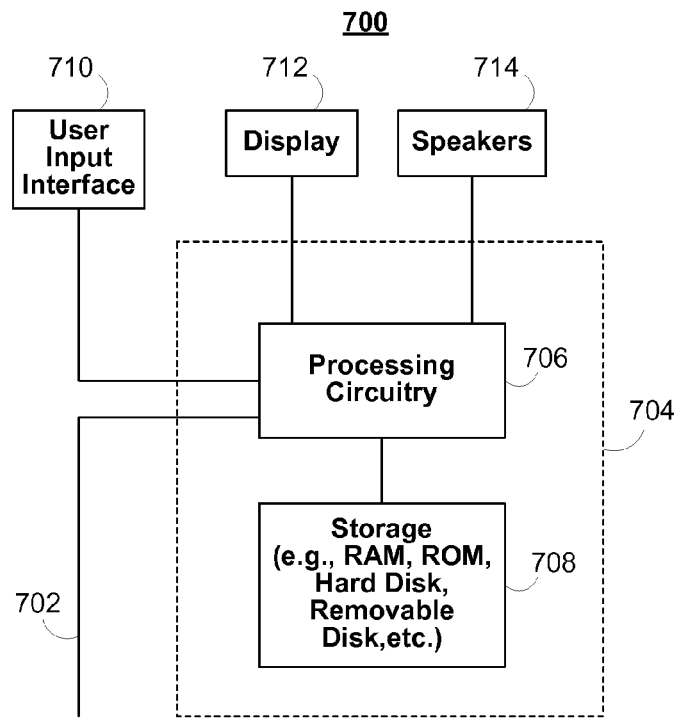
FIG. 7 shows a generalized embodiment of an illustrative user equipment device in accordance with one embodiment of the present invention.

Users may access media content and the media guidance application (and its display screens described above and below) from one or more of their user equipment devices. FIG. 7 shows a generalized embodiment of illustrative user equipment device 700. More specific implementations of user equipment devices are discussed below in connection with FIG. 8. User equipment device 700 may receive media content and data via input/output (hereinafter "I/O") path 702. I/O path 702 may provide media content (e.g., broadcast programming, on-demand programming, Internet content, and other video or audio) and data to control circuitry 704, which includes processing circuitry 706 and storage 708. Control circuitry 704 may be used to send and receive commands, requests, and other suitable data using I/O path 702. I/O path 702 may connect control circuitry 704 (and specifically processing circuitry 706) to one or more communications paths (described below). I/O functions may be provided by one or more of these communications paths, but are shown as a single path in FIG. 7 to avoid overcomplicating the drawing.

Control circuitry 704 may be based on any suitable processing circuitry 706 such as processing circuitry based on one or more microprocessors, microcontrollers, digital signal processors, programmable logic devices, etc. In some embodiments, control circuitry 704 executes instructions for a media guidance application stored in memory (i.e., storage 708). In client-server based embodiments, control circuitry 704 may include communications circuitry suitable for communicating with a guidance application server or other networks or servers. Communications circuitry may include a cable modem, an integrated services digital network (ISDN) modem, a digital subscriber line (DSL) modem, a telephone modem, or a wireless modem for communications with other equipment. Such communications may involve the Internet or any other suitable communications networks or paths (which is described in more detail in connection with FIG. 8). In addition, communications circuitry may include circuitry that enables peer-to-peer communication of user equipment devices, or communication of user equipment devices in locations remote from each other (described in more detail below).

Memory (e.g., random-access memory, read-only memory, or any other suitable memory), hard drives, optical drives, or any other suitable fixed or removable storage devices (e.g., DVD recorder, CD recorder, video cassette recorder, or other suitable recording device) may be provided as storage 708 that is part of control circuitry 704. Storage 708 may include one or more of the above types of storage devices. For example, user equipment device 700 may include a hard drive for a DVR (sometimes called a personal video recorder, or PVR) and a DVD recorder as a secondary storage device. Storage 708 may be used to store various types of media described herein and guidance application data, including program information, guidance application settings, user preferences or profile information, or other data used in operating the guidance application. Nonvolatile memory may also be used (e.g., to launch a boot-up routine and other instructions).

Control circuitry 704 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 704 may also include scaler circuitry for upconverting and downconverting media into the preferred output format of the user equipment 700. Circuitry 704 may also include digital-to-analog converter circuitry and analog-to-digital converter circuitry for converting between digital and analog signals. The tuning and encoding circuitry may be used by the user equipment to receive and to display, to play, or to record media content. The tuning and encoding circuitry may also be used to receive guidance data. The circuitry described herein, including for example, the tuning, video generating, encoding, decoding, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 708 is provided as a separate device from user equipment 700, the tuning and encoding circuitry (including multiple tuners) may be associated with storage 708.

A user may direct control circuitry 704 using user input interface 710. User input interface 710 may be any suitable user interface, such as a remote control, mouse, trackball, keypad, keyboard, touch screen, touch pad, stylus input, joystick, voice recognition interface, or other user input interfaces. Display 712 may be provided as a stand-alone device or integrated with other elements of user equipment device 700. Display 712 may be one or more of a monitor, a television, a liquid crystal display (LCD) for a mobile device, or any other suitable equipment for displaying visual images. In some embodiments, display 712 may be HDTV-capable. Speakers 714 may be provided as integrated with other elements of user equipment device 700 or may be stand-alone units. The audio component of videos and other media content displayed on display 712 may be played through speakers 714. In some embodiments, the audio may be distributed to a receiver (not shown), which processes and outputs the audio via speakers 714.

Figure 8:
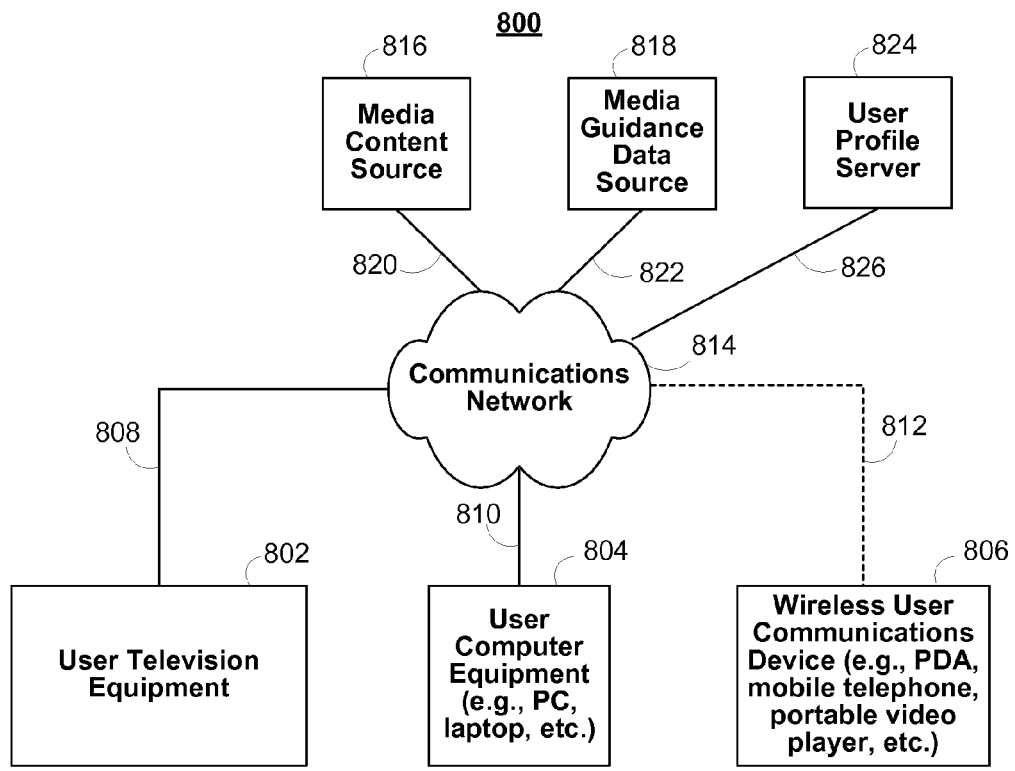
FIG. 8 shows a generalized embodiment of an illustrative interactive media guidance system in accordance with one embodiment of the present invention.

User equipment device 700 of FIG. 7 can be implemented in system 800 of FIG. 8 as user television equipment 802, user computer equipment 804, wireless user communications device 806, or any other type of user equipment suitable for accessing media, such as a non-portable gaming machine. For simplicity, these devices may be referred to herein collectively as user equipment or user equipment devices. User equipment devices, on which a media guidance application is implemented, may function as a standalone device or may be part of a network of devices. Various network configurations of devices may be implemented and are discussed in more detail below.

User television equipment 802 may include a set-top box, an integrated receiver decoder (IRD) for handling satellite television, a television set, a digital storage device, a DVD recorder, a video-cassette recorder (VCR), a local media server, or other user television equipment. One or more of these devices may be integrated to be a single device, if desired. User computer equipment 804 may include a PC, a laptop, a tablet, a WebTV box, an Apple TV, a personal computer television (PC/TV), a PC media server, a PC media center, or other user computer equipment. WEBTV is a trademark owned by Microsoft Corp. Wireless user communications device 806 may include PDAs, a mobile telephone, a portable video player, a portable music player, a portable gaming machine, or other wireless devices.

It should be noted that with the advent of television tuner cards for PC's, WebTV, and the integration of video into other user equipment devices, the lines have become blurred when trying to classify a device as one of the above devices. In fact, each of user television equipment 802, user computer equipment 804, and wireless user communications device 806 may utilize at least some of the system features described above in connection with FIG. 7 and, as a result, include flexibility with respect to the type of media content available on the device. For example, user television equipment 802 may be Internet-enabled allowing for access to Internet content, while user computer equipment 804 may include a tuner allowing for access to television programming. The media guidance application may also have the same layout on the various different types of user equipment or may be tailored to the display capabilities of the user equipment. For example, on user computer equipment, the guidance application may be provided as a web site accessed by a web browser. In another example, the guidance application may be scaled down for wireless user communications devices.

In system 800, there is typically more than one of each type of user equipment device but only one of each is shown in FIG. 8 to avoid overcomplicating the drawing. In addition, each user may utilize more than one type of user equipment device (e.g., a user may have a television set and a computer) and also more than one of each type of user equipment device (e.g., a user may have a PDA and a mobile telephone and/or multiple television sets).

The user may also set various settings such as user profile settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.tvguide.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

User profile information including user settings, user personalization, user preference, rules, and user media content information may be stored on user equipment devices and/or on user profile server 824. User profile server 824 may be in communication with user equipment devices 802, 804 and 806 through communications path 826 and communications network 814. User profile server 824 may include storage devices for storing user profile information associated with user media networks. User profile server 824 may also include storage devices for storing media content information associated with user media networks including recordings of media content and/or lists of selected media content. User profile server 824 may include processors and communications circuits for managing user profile information, remotely controlling and communicating with user equipment devices, and exchanging user profile information with user equipment devices.

The user equipment devices may be coupled to communications network 814. Namely, user television equipment 802, user computer equipment 804, and wireless user communications device 806 are coupled to communications network 814 via communications paths 808, 810, and 812, respectively. Communications network 814 may be one or more networks including the Internet, a mobile phone network, mobile device (e.g., Blackberry) network, cable network, public switched telephone network, or other types of communications network or combinations of communications networks. BLACKBERRY is a trademark owned by Research In Motion Limited Corp. Paths 808, 810, and 812 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 812 is drawn with dotted lines to indicate that in the exemplary embodiment shown in FIG. 8 it is a wireless path and paths 808 and 810 are drawn as solid lines to indicate they are wired paths (although these paths may be wireless paths, if desired). Communications with the user equipment devices may be provided by one or more of these communications paths, but are shown as a single path in FIG. 8 to avoid overcomplicating the drawing.

Although communications paths are not drawn between user equipment devices, these devices may communicate directly with each other via communication paths, such as those described above in connection with paths 808, 810, and 812, as well other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a trademark owned by Bluetooth SIG, INC. The user equipment devices may also communicate with each other directly through an indirect path via communications network 814.

System 800 includes media content source 816, media guidance data source 818, and user profile server 824 coupled to communications network 814 via communication paths 820, 822 and 826, respectively. Paths 820, 822 and 826 may include any of the communication paths described above in connection with paths 808, 810, and 812. Communications with the media content source 816, the media guidance data source 818 and the user profile server 824 may be exchanged over one or more communications paths, but are shown as a single path in FIG. 8 to avoid overcomplicating the drawing. In addition, there may be more than one of each of media content source 816, media guidance data source 818 and user profile server 824, but only one of each is shown in FIG. 8 to avoid overcomplicating the drawing. (The different types of each of these sources are discussed below.) If desired, media content source 816 and media guidance data source 818 may be integrated as one source device. Although communications between sources 816 and 818 and server 824 with user equipment devices 802, 804, and 806 are shown as through communications network 814, in some embodiments, sources 816 and 818 and server 824 may communicate directly with user equipment devices 802, 804, and 806 via communication paths (not shown) such as those described above in connection with paths 808, 810, and 812.

Media content source 816 may include one or more types of media distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other media content providers. NBC is a trademark owned by the National Broadcasting Company, Inc., ABC is a trademark owned by the ABC, INC., and HBO is a trademark owned by the Home Box Office, Inc. Media content source 816 may be the originator of media content (e.g., a television broadcaster, a Webcast provider, etc.) or may not be the originator of media content (e.g., an on-demand media content provider, an Internet provider of video content of broadcast programs for downloading, etc.). Media content source 816 may include cable sources, satellite providers, on-demand providers, Internet providers, or other providers of media content. Media content source 816 may also include a remote media server used to store different types of media content (including video content selected by a user), in a location remote from any of the user equipment devices, Systems and methods for remote storage of media content, and providing remotely stored media content to user equipment are discussed in greater detail in connection with Ellis et al., U.S. patent application Ser. No. 09/332,244, filed Jun. 11, 1999, which is hereby incorporated by reference herein in its entirety.

Media guidance data source 818 may provide media guidance data, such as media listings, media-related information (e.g., broadcast times, broadcast channels, media titles, media descriptions, ratings information (e.g., parental control ratings, critic's ratings, etc.), genre or category information, actor information, logo data for broadcasters' or providers' logos, etc.), media format (e.g., standard definition, high definition, etc.), advertisement information (e.g., text, images, media clips, etc.), on-demand information, and any other type of guidance data that is helpful for a user to navigate among and locate desired media selections.

Media guidance application data may be provided to the user equipment devices using any suitable approach. In some embodiments, the guidance application may be a stand-alone interactive television program guide that receives program guide data via a data feed (e.g., a continuous feed, trickle feed, or data in the vertical blanking interval of a channel). Program schedule data and other guidance data may be provided to the user equipment on a television channel sideband, in the vertical blanking interval of a television channel, using an in-band digital signal, using an out-of-band digital signal, or by any other suitable data transmission technique. Program schedule data and other guidance data may be provided to user equipment on multiple analog or digital television channels. Program schedule data and other guidance data may be provided to the user equipment with any suitable frequency (e.g., continuously, daily, a user-specified period of time, a system-specified period of time, in response to a request from user equipment, etc.). In some approaches, guidance data from media guidance data source 818 may be provided to users' equipment using a client-server approach. For example, a guidance application client residing on the user's equipment may initiate sessions with source 818 to obtain guidance data when needed. Media guidance data source 818 may provide user equipment devices 802, 804, and 806 the media guidance application itself or software updates for the media guidance application.

Media guidance applications may be, for example, stand-alone applications implemented on user equipment devices. In other embodiments, media guidance applications may be client-server applications where only the client resides on the user equipment device. For example, media guidance applications may be implemented partially as a client application on control circuitry 704 of user equipment device 700 and partially on a remote server as a server application (e.g., media guidance data source 818). The guidance application displays may be generated by the media guidance data source 818 and transmitted to the user equipment devices. The media guidance data source 818 may also transmit data for storage on the user equipment, which then generates the guidance application displays based on instructions processed by control circuitry.

Media guidance system 800 is intended to illustrate a number of approaches, or network configurations, by which user equipment devices and sources of media content and guidance data may communicate with each other for the purpose of accessing media and providing media guidance. The present invention may be applied in any one or a subset of these approaches, or in a system employing other approaches for delivering media and providing media guidance. The following three approaches provide specific illustrations of the generalized example of FIG. 8.

In one approach, user equipment devices may communicate with each other within a home network. User equipment devices can communicate with each other directly via short-range point-to-point communication schemes describe above, via indirect paths through a hub or other similar device provided on a home network, or via communications network 814. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. patent application Ser. No. 11/179,410, filed Jul. 11, 2005. Different types of user equipment devices in a home network may also communicate with each other to transmit media content. For example, a user may transmit media content from user computer equipment to a portable video player or portable music player.

In a second approach, users may have multiple types of user equipment by which they access media content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, are discussed in, for example, Ellis et al., U.S. patent application Ser. No. 10/927,814, filed Aug. 26, 2004, which is hereby incorporated by reference herein in its entirety.

In a third approach, users of user equipment devices inside and outside a home can use their media guidance application to communicate directly with media content source 816 to access media content. Specifically, within a home, users of user television equipment 804 and user computer equipment 806 may access the media guidance application to navigate among and locate desirable media content. Users may also access the media guidance application outside of the home using wireless user communications devices 806 to navigate among and locate desirable media content.

It will be appreciated that while the discussion of media content has focused on video content, the principles of media guidance can be applied to other types of media content, such as music, images, etc.

FIGS. 9-13 show illustrative embodiments of data structures that may be used in accordance with the principles of the present invention to store user profile information, including rules for performing recordings, in memories of user equipment devices and user profile servers. The data structures of FIGS. 9-13 also show illustrative types of data that may be stored and used by systems providing management of user profiles. The data structures may be used to create and maintain a database of user equipment devices associated with users' media networks, and of user profile information for each media network. The data stored in the data structures may be stored in memories located in user equipment 802, 804 or 806, in one or more user profile servers 824, or on any other servers or devices accessible through communications network 814. The data may alternatively be distributed across different servers and devices, with, for example, device-specific profile information located on the devices the information corresponds to, and more general profile information stored on the user profile server. In one embodiment, the user profile server 824 may be operative to synchronize user profile information stored on the server with that stored on one or more user equipment devices. The profile server may thus be operative to communicate with the equipment devices, and to process the received profile information in order to maintain up-to-date profile information.

The information stored in the data structures of FIGS. 9-13 may include information based on settings input by a user, information based on user activity monitored by a guidance application or user equipment device or both. It will be appreciated that all fields in data structures of FIGS. 9-13 may be organized using any organization scheme. For simplicity, the organization scheme used to describe fields in the data structures of FIGS. 9-13 will be a list.

Figure 9:
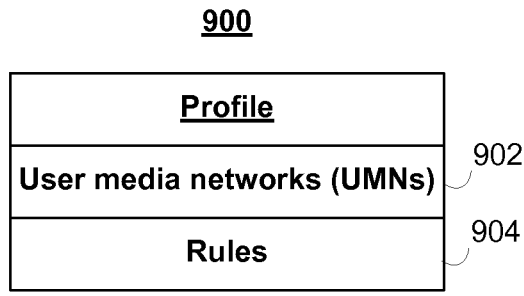
FIG. 9 is a diagram of an illustrative profile data structure in accordance with one embodiment of the present invention.

FIG. 9 shows an illustrative embodiment of a profile data structure 900. Data structure 900 may include field 902 that includes a list of user media networks (UMNs) for which user profile information is stored in the data structure. Field 902 may be organized in the form of a linked list of UMN identifiers, an array of UMN identifiers, a table of UMN identifiers, or any other organization scheme of UMN identifiers.

Each UMN listed in field 902 may be identified by a name and/or other unique identifier that may be used to uniquely identify and locate the UMN. The identifier may include, for example, a username or an equipment address that may be used to locate or identify the UMN on communications network 814. Additional information that may be included in UMN field 902 is described in more detail in connection with FIGS. 10-13.

Data structure 900 may also include field 904 that includes a list of rules for assigning a user equipment device of one or more UMNs as a destination for media content. This approach may be of particular use, for example, when the rules apply to every UMN (e.g., the UMNs are all within a household, and a parent has defined a rule for controlling recording operations within the household).

Figure 10:
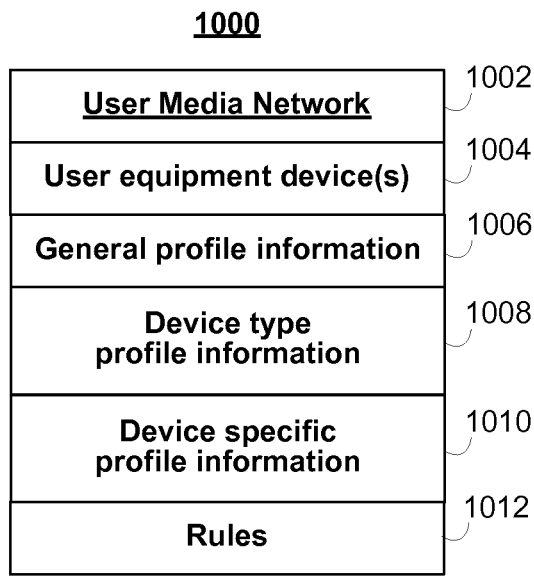
FIG. 10 is a diagram of an illustrative user media network data structure in accordance with one embodiment of the present invention.

FIG. 10 shows an illustrative embodiment of a user media network data structure 1000. Information for multiple UMNs may be stored on user equipment devices and profile servers, and thus multiple instances of UMN information data structure 1000, corresponding to different UMNs, may be required. Data structure 1000 may include field 1002 that may include a unique name, address and/or identifier corresponding to a particular UMN. Data structure 1000 may further include field 1004 which stores a list of all user equipment devices associated with the UMN. Data structure 1000 may also include fields 1006, 1008 and 1010 which respectively store general user profile information, device-type specific profile information, and device-specific profile information. Data structure 1000 may also include field 1012, which stores rules for assigning a user equipment device as a destination for media content selected by the user that apply to the users or devices of the UMN.

Each of fields 1006, 1008, 1010 and 1012 may point to separate profile information data structures such as data structure 900 of FIG. 9. Note that while data structure 1000 has separate general, device-type specific, device-specific profile information data and rules fields, data structure 1000 may have different combinations of profile information data fields than that shown in FIG. 10.

For example, in embodiments in which UMN data structure 1000 is stored on a user equipment device, data structure 1000 may include only a device-specific profile information field 1010 containing profile information for the specific device and a rules field 1012 that includes rules that identify the user equipment device (e.g., no field 1012 or an empty field 1012 for user equipment devices that are not assigned as destinations for media content). In such an embodiment, the device-specific profile information data structure stored on the device may include all of the profile information that is stored in the general and device-type specific data fields 1006 and 1008 and that is useable by the user equipment device. In such an embodiment, the UMN data structure 1000 may include data field 1004 including a list of user equipment devices associated with the user media network if the equipment device is capable of communicating with other equipment devices. However, data field 1004 may be omitted in data structures stored on user equipment devices that cannot communicate with other equipment devices.

Each user equipment device (UED) listed in data field 1004 may have an associated UED data structure storing information about the user equipment device. The UED data structure may include information such as the device name, device address or other identifier of the location of the device, device type and device capabilities. The UED data structure may additionally include information regarding the device's availability. The device availability information may include information about the device's current availability, such as an indication of whether the device is powered on, available to receive commands, or busy performing other functions. The device availability information may also include device scheduling information. The device scheduling information may include information and commands used for scheduling functions on the device, as well as a schedule of times when the device is scheduled to be available or not available. The UED data structure may also include additional information for specific types of devices. For example, the data structure may store information about the total and remaining storage space on user recording devices, the types of data the recording may record (e.g., digital or analog video or audio data), and the quality of the recording.

Figure 11:
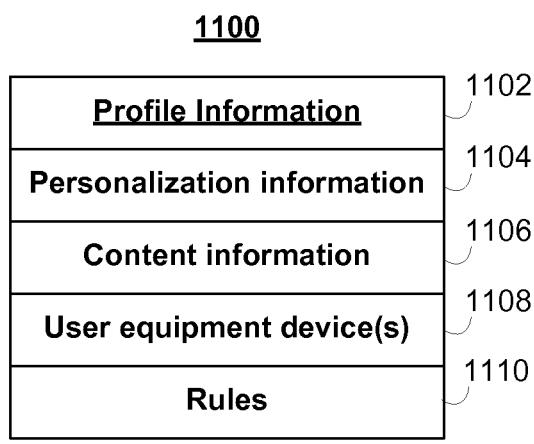
FIG. 11 is a diagram of an illustrative profile information data structure in accordance with one embodiment of the present invention.

FIG. 11 shows an illustrative embodiment of a profile information data structure 1100. Profile information data structure 1100 may include field 1102 that may include a unique name, address and/or identifier corresponding to the profile information data structure. Data structure 1100 may include personalization information field 1104 including user personalization data used in generating display screens, program recommendations, and other personalized menus and functions for users. Content information field 1106 may include information on media content stored by or otherwise available to the user. Data structure 1100 may also include a list of user equipment devices associated with the user media network in field 1108. The data in field 1108 may be used to enable communication between equipment devices, for example. The data in field 1108 may be identical, or substantially identical, to the information stored in field 1004 of FIG. 10. Thus, each user equipment device listed in field 1108 may have an associated UED data structure identical to, or substantially identical to, the UED data structures discussed in relation to field 1004.

Profile information data structure 1100 may include field 1110 for storing rules defined by or associated with the user identified in field 1102. The rules may include conditions used to identify media content and user equipment device identification information for assigning the identified user equipment device as a destination for the media content that satisfies the conditions. The user equipment devices may be identified from the data stored in field 1108.

Figure 12:
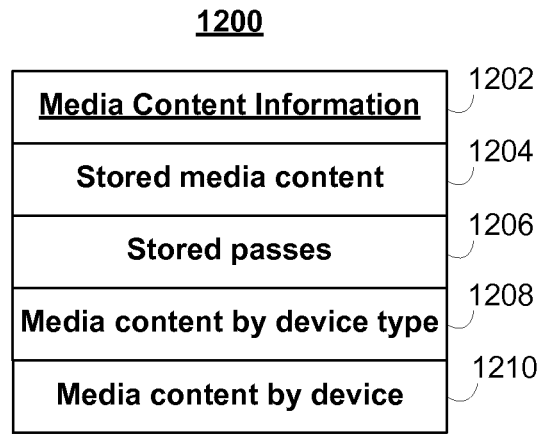
FIG. 12 is a diagram of an illustrative media content information data structure in accordance with one embodiment of the present invention.

FIG. 12 shows an illustrative embodiment of a media content information data structure 1200. Media content information stored in data structure 1200 may include information on stored media content and stored passes for media content. Media content information data structure 1200 may include field 1202 that may include a unique name, address and/or identifier corresponding to the media content information data structure. Field 1204 may include a list of media content that has been stored by the user (e.g., recorded, downloaded, streamed, or cached). Each item of media content listed in field 1204 may have an associated data structure including the recorded media content and information about the storage of the media content. Information about the storage of the media content may include the title, media type, content type, and the quality of the stored media content. The information may also include the storage location, identifying the user equipment device and location in memory at which the media content is located. The information may also include an indication of the types of devices the media content may be displayed on.

Field 1206 may store information on passes that the user may have access to. The passes may allow users to access media content stored at other locations, such as media content stored on other users' media network or on content provider servers 816 such as video-on-demand sources.

Data structure 1200 may include additional fields storing lists of media content organized by device type or by device. Media content by device type field 1208 may store lists of media content that may be accessed from different types of devices. Field 1208 may, for example, include a first list of all media content a UMN has access to and that may be viewed on a television. Field 1208 may also include a second list of all media content that may be viewed on a cell-phone. Media content by device field 1210 may include a list of all media content stored on each device associated with the UMN. Field 1210 may, for example, store a first list of all media content stored on a digital video recorder and a second list of all media content stored on a personal media player. For each instance of media content listed in fields 1204, 1208 and 1210 may identify, in addition to the user equipment devices on which the content is stored, the rule(s), if any, that were used to associate the media content to the particular user equipment device(s).

Figure 13:
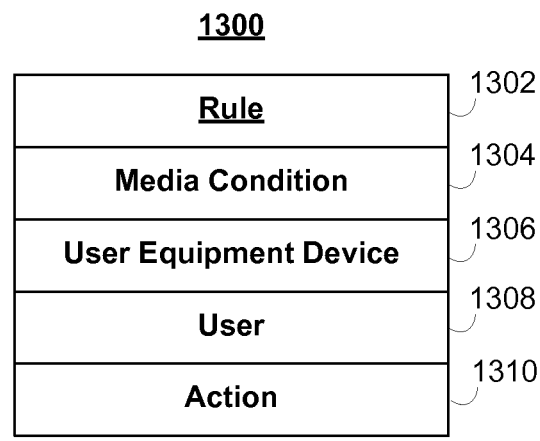
FIG. 13 is a diagram of an illustrative rule data structure in accordance with one embodiment of the present invention.

FIG. 13 shows an illustrative embodiment of a rule data structure 1300. Rule data structure 1300 may include field 1302 that may include a unique name, address and/or identifier corresponding to the rule data structure. Data structure 1300 may include media condition field 1304 that includes the conditions for identifying the media content for which a rule will apply. Media conditions stored in field 1304 may include, for example, program ratings (e.g., G or PG), actors, themes, program rankings (e.g., 4 stars or 3 stars), user preferences, or any other suitable condition. In some embodiments, the conditions may be selected such that no user equipment device is inherently more suited to store media content (e.g., for embodiments in which HD or regular transmission is not be a condition stored in field 1304).

Data structure 1300 may include user equipment device field 1306, which includes an identifier for the one or more user equipment devices that are a destination for media content that satisfies a condition of field 1302. The data in field 1306 may include data that is stored in one or both of field 1004 of FIG. 10 and field 1108 of FIG. 11. Data structure 1300 may include user field 1308, which identifies the user or user profile associated with a particular rule. The data in field 1308 may include data that is stored in field 1102 of FIG. 11.

Data structure 1310 may include action field 1310, which includes information related to the action that is performed by the one or more user equipment devices identified in field 1306. For example, action field 1310 may specify that the rule directs the one or more identified user equipment devices to record, stream, or download media content. As another example, action field 1310 may specify that the rule directs the one or more identified user equipment devices to transfer a recording from a default recording device to the identified user equipment device.

Rule data structure 1300 may include data related to a plurality of rules. For example, each rule may include a unique identifier that is applied to the data associated with the particular rule stored in each field of data structure 1300. In some embodiments, the data associated with each rule may be stored in a distinct data structure 1300.

Figure 14:
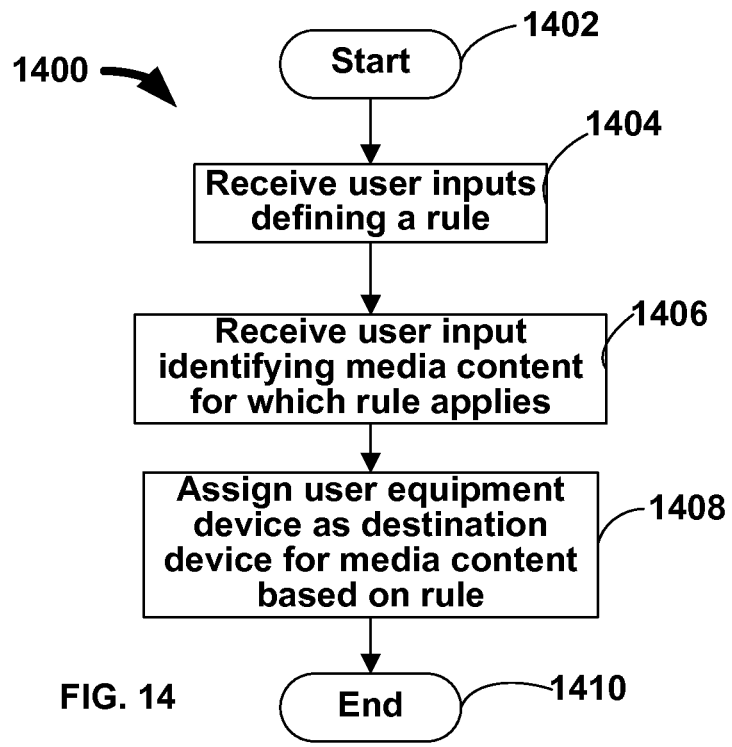
FIG. 14 shows an illustrative flow chart of a process for allowing a user to assign a device among a plurality of devices in a user's media network as a destination for media content in accordance with the present invention.

The following flow charts describe processes for creating and applying rules in some embodiments of this invention. FIG. 14 shows an illustrative process for allowing a user to assign a device among a plurality of devices in a user's media network as a destination for media content in accordance with an embodiment of the invention. Process 1400 begins at step 1402. At step 1404, the media guidance application receives user inputs defining a rule for assigning a user equipment device as the destination of media content. For example, processing circuitry 706 (FIG. 7) may receive inputs entered using user input interface 710 (FIG. 7). The user inputs may include identification information for one or more user equipment devices as destinations for media content. For example, the user inputs may include a selection from a listing of user equipment devices, or identification information entered by the user (e.g., an IP address or unique identifier). The user inputs may also include conditions identifying media content for which the rule applies. The conditions may include any suitable attribute of media content, including for example, theme, actor, genre, rating, definition, or any other suitable attribute. In some embodiments, the media guidance application may select the attribute from user profile information (e.g., the rule assigns media content that is of interest to the user to a particular user equipment device). The rule may be stored in a data structure similar to data structure 1300 (FIG. 13).

At step 1406, the media guidance application receives a user input identifying media content for which the rule applies. In some embodiments, processing circuitry 706 may receive inputs entered using user input interface 710. For example, the user may select media content for recording, or select media content to download or stream. As another example, the user may select media content to transfer from a first user equipment device to another user equipment device. The media guidance application may compare the attributes of the identified media content with the attributes selected for the condition of the rule at step 1404. If the attributes of the identified media content match the condition of the rule, process 1400 continues to step 1408. If the attributes of the identified media content do not match the conditions of the rule, the rule is not applied to the media content and process 1400 terminates.

At step 1408, the media guidance application assigns a user equipment device as the destination for the media content identified at step 1406 based on the rule defined at step 1404. In some embodiments, processing circuitry 706 may assign a user equipment device 802, 804 or 806 (FIG. 8) as a destination device. For example, the media guidance application may identify the user equipment devices of the rule and direct the identified user equipment devices to serve as a destination for the media content. The user equipment devices may serve as a destination for the media content by recording the content, streaming the content, downloading the content, caching the content, transferring the content or any other method by which content is assigned to a user equipment device. Process 1400 then ends at step 1410.

Figure 15:
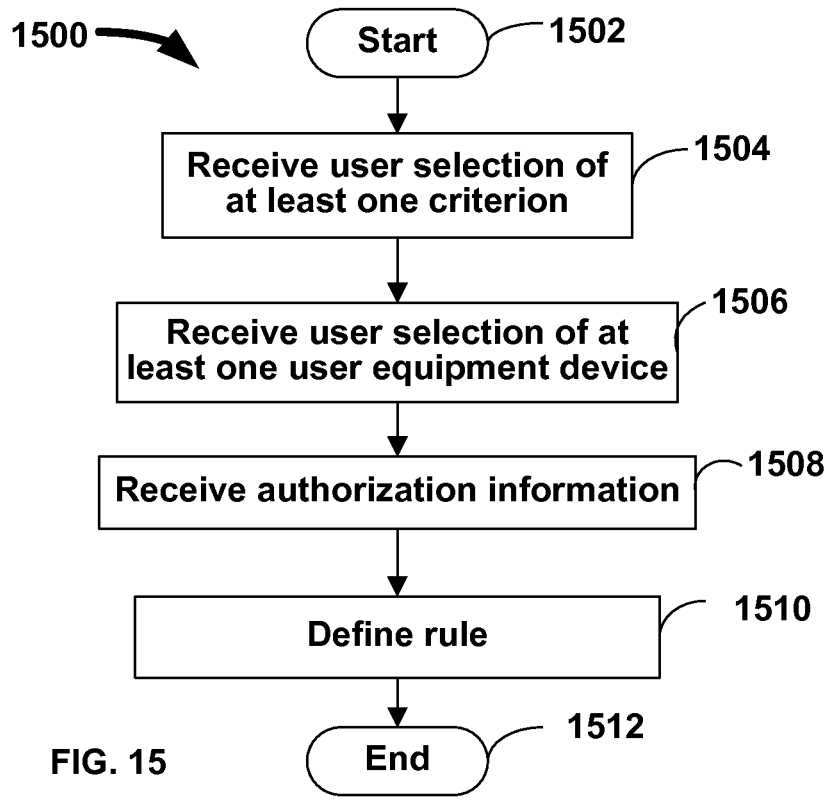
FIG. 15 shows a flow chart of an illustrative process for setting up a rule in accordance with an embodiment of the invention.

FIG. 15 shows a flow chart of an illustrative process for setting up a rule in accordance with an embodiment of the invention. Process 1500 begins at step 1502. At step 1504, the media guidance application receives a user selection of at least one criterion for the rule. In some embodiments, processing circuitry 706 (FIG. 7) may receive at least one criterion from a user input on user input interface 710 (FIG. 1). The criterion may be an attribute of media content, user profile data, time and channel data, a URL, or any other suitable criteria for identifying media content. At step 1506, the media guidance application receives a user selection of a user equipment device as a destination for media content. In some embodiments, processing circuitry 706 may receive a user selection of a user equipment device from a user input on user input interface 710. The user may select any suitable user equipment device, including for example, a recording device, a computer, a portable electronic device, a cellular telephone, or any other suitable electronic device.

At step 1508, the media guidance application receives authorization information. In some embodiments, processing circuitry 706 may receive authorization information from user inputs on user input interface 710. For example, the user may enter parental control data to authorize the user to define a rule. As another example, the user may login to the user's media network. At step 1510, the media guidance application defines the a rule using the condition identified at step 1504 and the user equipment device identified at step 1506 to assign the identified user equipment device as a destination for media content that satisfies the identified condition. In some embodiments, processing circuitry 706 may create a data structure 1300 (FIG. 13) for the rule. Process 1500 then ends at step 1512.

Figure 16:
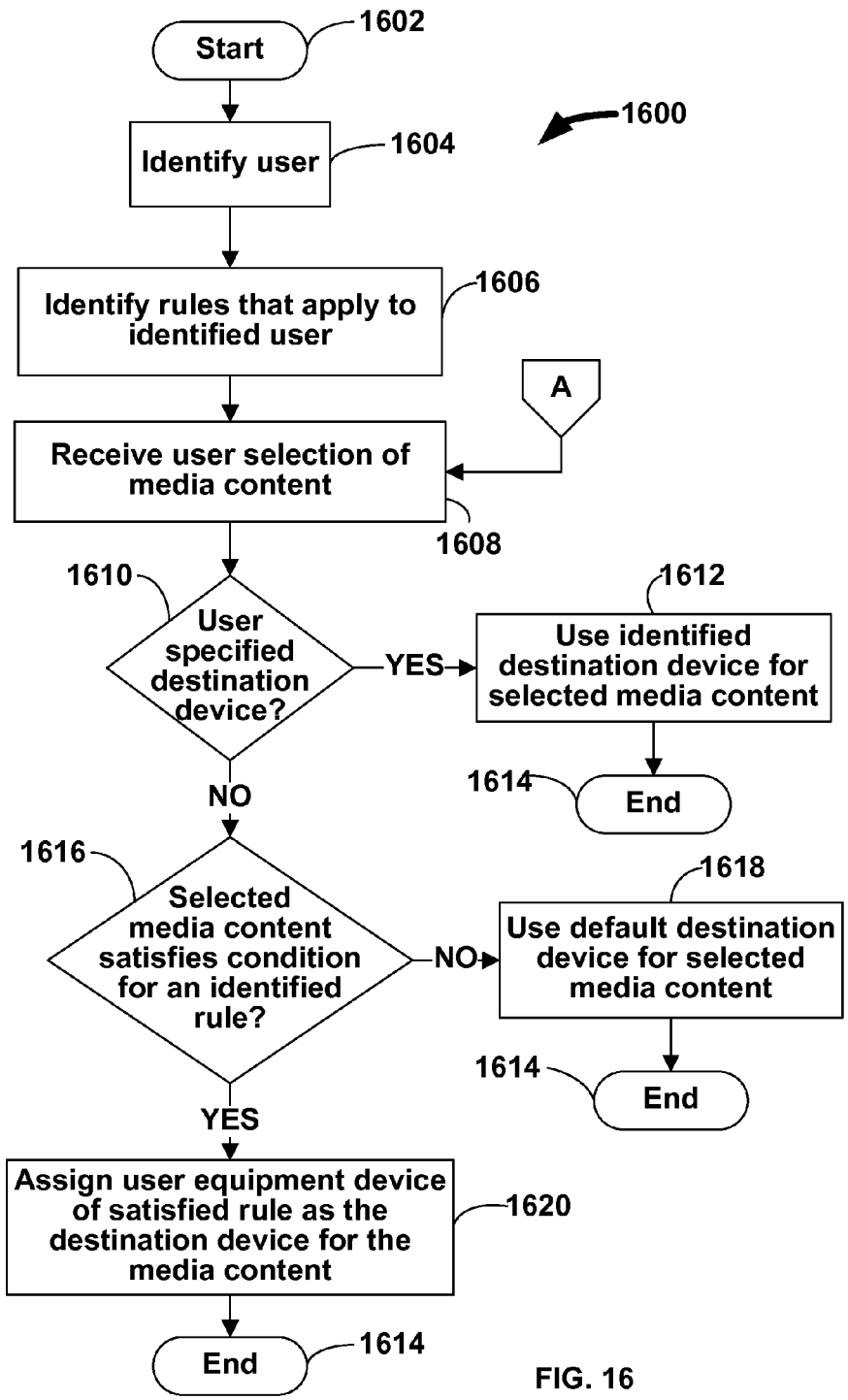
FIG. 16 shows a flowchart of an illustrative process for assigning a user equipment device as a destination for media content selected by an identified user in accordance with an embodiment of the invention.

FIG. 16 shows a flowchart of an illustrative process for assigning a user equipment device as a destination for media content selected by an identified user in accordance with an embodiment of the invention. Process 1600 begins at step 1602. At step 1604, the media guidance application identifies the current user. For example, the media guidance application may identify the user that has logged in the system. As another example, the media guidance application may identify the user based on the user's interactions with the guidance application. As still another example, the guidance application may identify the user based on the time of day (e.g., using a day-parting approach).

At step 1606, the media guidance application identifies the rules that apply to the identified user. For example, the media guidance application may identify the rules defined by the user. As another example, the media guidance application may identify the rules that involve user equipment devices that are part of the user's media network. In some embodiments, processing circuitry 706 (FIG. 7) may identify the rules associated with field 1110 (FIG. 11) of the identified user's profile information data structure 1100 (FIG. 11).

At step 1608, the media guidance application receives a user selection of media content. In some embodiments, processing circuitry 706 may receive user inputs from user input interface 710 (FIG. 7). For example, the user may select media content from content listings, while viewing the content, or from any other suitable context. The media content may be selected for recording, downloading, streaming, caching, or any other suitable process by which user equipment devices of the user's media network are destination devices for media content.

At step 1610, the media guidance application determines whether the user specified a destination device for the selected media content. In some embodiments, processing circuitry 706 may determine whether the user provided an input using user input interface 710 for specifying the destination device. For example, the media guidance application may determine whether the user selected a particular user equipment device as a destination for media content when the user selected the media content (e.g., selecting a recording device when setting up a recording). If the media guidance application determines that a particular user equipment device was selected, process 1600 moves to step 1612. At step 1612, the identified user equipment device is assigned as a destination for the selected media content. For example, processing circuitry 706 assigns the identified user equipment device 802, 804 or 806 (FIG. 8) as a destination for the selected media content. Process 1600 then ends at step 1614.

If, at step 1610, the media guidance application instead determines that no particular user equipment device was selected as a destination for the selected media content, process 1600 moves to step 1616. In some embodiments, process 1600 may include an additional step for determining whether rules apply for the selected media. For example, the media guidance application may determine whether the user selected an option to record a program using rules. If the rules do not apply, a default user equipment device may be used as the destination for the selected media content (e.g., step 1618).

At step 1616, the media guidance application determines whether the selected media content satisfies a condition for one of the rules identified at step 1606. In some embodiments, processing circuitry 706 may determine whether the selected media content satisfies media condition field 1304 (FIG. 13) for the data structure 1300 (FIG. 13) of one of the rules. For example, the media guidance application may compare the attributes of the selected media content with the conditions for each of the rules identified at step 1606. If the media guidance application determines that none of the identified rules have conditions that are satisfied by the selected media content, process 1600 moves to step 1618.

At step 1618, the media guidance application uses a default user equipment device as a destination device for the selected media content. For example, the media guidance application may use a default recording device to perform a recording. Process 1600 then ends at step 1614.

If, at step 1616, the media guidance application instead determines that at least one of the identified rules has a condition that is satisfied by the selected media content, process 1600 moves to step 1620. At step 1620, the media guidance application assigns the user equipment device of at least one rule whose condition is satisfied by the selected media content as the destination device for the selected media content. In some embodiments, processing circuitry 706 may assign user equipment devices 802, 804 and 806 identified in user equipment device field 1306 (FIG. 13) of data structures 1300 of rules for which the media content satisfies media condition field 1304 as destination devices for the selected content. Processing circuitry 706 may then direct the identified user equipment devices 802, 804 and 806 to record, download, stream, cache, transfer (or perform any other suitable action with) the selected media content. For example, the media guidance application may identify every rule that is satisfied by the media content, and use every device associated with those rules as destination devices for the selected media content. As another example, the media guidance application may use only one or some of the destination devices of the rules. The one or some of the user equipment devices used may be selected, for example, using conflict rules, priority rules, or any other suitable mechanism. Process 1600 then ends a step 1614.

Figure 17:
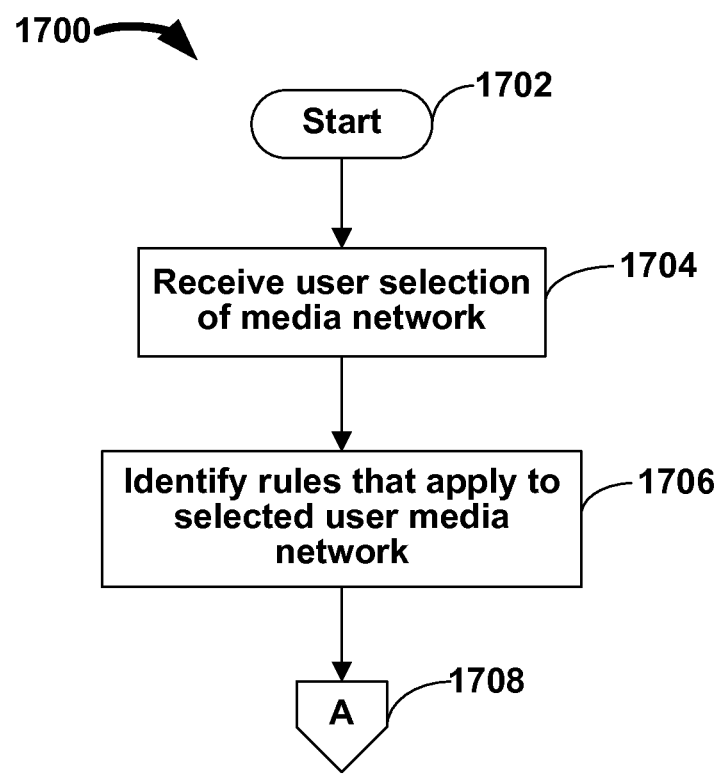
FIG. 17 shows an illustrative process for identifying the applicable rules when a user is not identified in accordance with an embodiment of the invention.

FIG. 17 shows an illustrative process for identifying the applicable rules when a user is not identified in accordance with an embodiment of the invention. Process 1700 begins at step 1702. At step 1704, the media guidance application receives a user selection of a media network. For example, the user may access one or a combination of user equipment devices that are associated with a user media network. As another example, the user may login to a user media network (e.g., login to a household network without identifying which household member it is).

At step 1706, the media guidance application identifies the rules that apply the user equipment devices of the identified user media network. For example, the media guidance application may identify the rules that are stored with the user media network data structure (e.g., field 1012 of data structure 1000, FIG. 10). As another example, the media guidance application may identify the rules that are stored with the user equipment devices of the user media network. Process 1700 then moves to step 1708, which may correspond to step 1608 of process 1600 (FIG. 16).

The above described embodiments of the present invention are presented for purposes of illustration and not of limitation, and the present invention is limited only by the claims which follow.

What is claimed is:

1. A method for allowing media content to be automatically assigned to a device among a plurality of devices belonging to a home media network of a user, the method comprising:
   receiving, using processing circuitry, a user input selecting the home media network from a plurality of home media networks, wherein each home media network from the plurality of home media networks:
   comprises devices associated with the user; and
   is in a location away from other home media networks of the plurality of home media networks;
   receiving, using processing circuitry, a user input selecting media content;
   identifying, using processing circuitry, a rule that applies to the selected home media network, wherein the rule identifies a device in the home media network and includes a condition that comprises at least one media content attribute;
   determining, using processing circuitry, if the rule is satisfied by the selected media content by comparing the condition of the rule to attributes of the selected media content; and
   in response to determining that the rule is satisfied, automatically assigning, using processing circuitry, the identified device of the selected home media network of the rule that applies to the selected home media network as the storage destination of the selected media content.

2. The method of claim 1, wherein the rule is defined by a user input, the user input comprising an identification of a device, an identification of the home media network, and at least one condition that must be satisfied by the media content for the identified device to be assigned as a destination device for the media content, wherein the at least one condition comprises at least one attribute that is an attribute associated with media content.

3. The method of claim 1, further comprising:
   determining whether the user specified a destination device for the selected media content; and
   assigning the specified destination device as a storage destination for the selected media content if a destination device is specified.

4. The method of claim 1, wherein receiving the user input selecting the home media network from the plurality of home media networks comprises receiving input at a device that is associated with the selected home media network.

5. The method of claim 1, wherein receiving the user input selecting the media content comprises receiving input identifying media content for recording.

6. The method of claim 1, wherein the rule is stored on a device in the selected home media network.

7. The method of claim 1, wherein automatically assigning the identified device of the selected home media network of the rule as the storage destination comprises automatically assigning the identified device to record the selected media content.

8. The method of claim 1, wherein receiving the user input selecting the media content comprises receiving input identifying stored media content for transferring.

9. The method of claim 1, further comprising automatically assigning a default device as the destination of the selected media content in response to determining that the rule fails to be satisfied by the selected media content for any of the plurality of devices belonging to the selected home media network.

10. A system for allowing media content to be automatically assigned to a device among a plurality of devices belonging to a home media network of a user, the system comprising processing circuitry configured to:
receive a user input selecting the home media network from a plurality of home media networks, wherein each home media network from the plurality of home media networks:
comprises devices associated with the user; and
is in a location away from other home media networks of the plurality of home media networks;
receive, a user input selecting media content;
identify a rule that applies to the selected home media network, wherein the rule identifies a device in the home media network and includes a condition that comprises at least one media content attribute;
determine if the rule is satisfied by the selected media content by comparing the condition of the rule to attributes of the selected media content; and
automatically assign the identified device of the selected home media network of the rule that applies to the selected home media network as the storage destination of the selected media content in response to determining that the rule is satisfied.

11. The system of claim 10, wherein the rule is defined by a user input, the user input comprising an identification of a device, an identification of the home media network, and at least one condition that must be satisfied by the media content for the identified device to be assigned as a destination device for the media content, wherein the at least one condition comprises at least one attribute that is an attribute associated with media content.

12. The system of claim 10, wherein the processing circuitry is further configured to:
determine whether the user specified a destination device for the selected media content; and
assign the specified destination device as a storage destination for the selected media content if a destination device is specified.

13. The system of claim 10, wherein the processing circuitry is further configured to receive the user input selecting the home media network from the plurality of home media networks at a device that is associated with the selected home media network.

14. The system of claim 10, wherein the processing circuitry is further configured to receive a user input identifying media content for recording.

15. The system of claim 10, wherein the rule is stored on a device in the selected home media network.

16. The system of claim 10, wherein processing circuitry is further configured to automatically assign the identified device to record the selected media content.

17. The system of claim 10, wherein the processing circuitry is further configured to receive a user input identifying stored media content for transferring.

18. The system of claim 10, wherein the processing circuitry is further configured to automatically assign a default device as the destination of the selected media content in response to determining that the rule fails to be satisfied by the selected media content for any of the plurality of devices belonging to the selected home media network.

* * * * *